United States Patent
Kotti et al.

(10) Patent No.: US 10,832,667 B2
(45) Date of Patent: Nov. 10, 2020

(54) SPOKEN DIALOGUE SYSTEM, A SPOKEN DIALOGUE METHOD AND A METHOD OF ADAPTING A SPOKEN DIALOGUE SYSTEM

(71) Applicant: Kabushiki Kaisha Toshiba, Minato-ku (JP)

(72) Inventors: Margarita Kotti, Cambridge (GB); Alexandros Papangelis, Cambridge (GB); Ioannis Stylianou, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 82 days.

(21) Appl. No.: 15/689,499

(22) Filed: Aug. 29, 2017

(65) Prior Publication Data

US 2018/0226076 A1    Aug. 9, 2018

(30) Foreign Application Priority Data

Feb. 6, 2017 (GB) .................................. 1701918.3

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G06F 16/3329* (2019.01);
(Continued)

(58) Field of Classification Search
None
See application file for complete search history.

(56) References Cited

U.S. PATENT DOCUMENTS 6,609,093 B1 * 8/2003 Gopinath ............. G06K 9/6234
                                                          382/190
9,741,336 B2 * 8/2017 Williams ................ G06F 40/56
(Continued)

FOREIGN PATENT DOCUMENTS

GB         2537903 A    11/2016
JP     2016-212405 A    12/2016

OTHER PUBLICATIONS

Sahidullah, Md.; Saha, Goutam, "Design, analysis and experimental evaluation of block based transformation in MFCC computation for speaker recognition". Speech Communication. 54 (4): pp. 543-565. (May 2012).*

(Continued)

*Primary Examiner* — Richard Z Zhu
(74) *Attorney, Agent, or Firm* — Oblon, McClelland, Maier & Neustadt, L.L.P.

(57) ABSTRACT

A spoken dialogue system comprising:
  an input for receiving data relating to speech signals originating from a user, where the speech signals form part of a dialogue;
  an output for outputting information specified by an action; and
  a processor configured to:
    extract one or more acoustic features from the input speech signal;
    determine an action using a dialogue model, wherein the input to the dialogue model is generated using the input speech signal;
    output information specified by the action at the output;
    generate a success measure using the acoustic features.

14 Claims, 11 Drawing Sheets

(51) Int. Cl.

| | | |
|---|---|---|
| G10L 13/00 | (2006.01) | |
| G10L 25/90 | (2013.01) | |
| G10L 25/18 | (2013.01) | |
| G10L 25/24 | (2013.01) | |
| G10L 25/21 | (2013.01) | |
| G06F 40/35 | (2020.01) | |
| G06F 16/332 | (2019.01) | |

(52) U.S. Cl.
CPC .............. *G06F 40/35* (2020.01); *G10L 13/00* (2013.01); *G10L 25/18* (2013.01); *G10L 25/21* (2013.01); *G10L 25/24* (2013.01); *G10L 25/90* (2013.01); *G10L 2015/223* (2013.01)

(56) References Cited

U.S. PATENT DOCUMENTS

| | | | |
|---|---|---|---|
| 2008/0201135 | A1 | 8/2008 | Yano |
| 2009/0112586 | A1 | 4/2009 | Williams |
| 2012/0053945 | A1 | 3/2012 | Gupta et al. |
| 2015/0039292 | A1* | 2/2015 | Suleman ............... G06F 17/289 704/9 |
| 2015/0169553 | A1* | 6/2015 | Watanabe ......... G06F 16/90332 704/9 |
| 2015/0363393 | A1* | 12/2015 | Williams .............. G06F 17/289 704/8 |
| 2016/0322050 | A1 | 11/2016 | Wang et al. |
| 2018/0075847 | A1* | 3/2018 | Lee ........................ G10L 15/22 |

OTHER PUBLICATIONS

Combined Great Britain Office Action and Search Report dated Sep. 26, 2017 in Great Britain Patent Application No. GB1701918.3.

Pei-Hao Su, et al., "On-line Active Reward learning for Policy Optimisation in Spoken Dialogue Systems", arXiv:1605.07669v2, Department of Engineering, University of Cambridge, Cambridge, UK, Jun. 2, 2016, 11 Pages.

Marilyn A. Walker, et al., "Paradise: A Framework for Evaluating Spoken Dialogue Agents", Association for Computational Linguistics, 1997, pp. 271-280.

Raul Fernandez, et al., "Dialog Act Classification from Prosodic Features Using Support Vector Machines", Proceedings of Speech Prosody, 2002, pp. 291-294.

Alessandra Cervone, et al., "Towards Automatic Detection of Reported Speech in Dialogue using Prosodic Cues", Interspeech'15, 2015, pp. 3061-3065.

Joseph Tepperman, et al., "Yeah Right: Sarcasm Recognition for Spoken Dialogue Systems", Interspeech'06, 2006, , pp. 1838-1841.

Jose Lopes, et al., "Detecting Repetitions in Spoken Dialogue Systems Using Phonetic Distances", Interspeech'15, 2015, pp. 1805-1809.

Layla El Asri, et al., "Task Completion Transfer Learning for Reward Inference", Machine Learning for Interactive Systems, 2014, pp. 38-43.

Pei-Hao Su, et al., "Learning from Real Users: Rating Dialogue Success with Neural Networks for Reinforcement Learning in Spoken Dialogue Systems", Interspeech, 2015, 5 Pages.

David Vandyke, et al., "Multi-Domain Dialogue Success Classifiers for Policy Training", IEEE Workshop on Automatic Speech Recognition and Understanding (ASRU), 2015, pp. 763-770.

Marilyn A. Walker, et al., "Quantitative and Qualitative Evaluation of Darpa Communicator Spoken Dialogue Systems", Proceedings of the 39th, annual Meeting on Association for Computational Linguistics, Association for Computational Linguistics, 2001, pp. 515-522.

Search Report dated May 1, 2018 in United Kingdom Patent Application No. GB1701918.3, 4 pages.

* cited by examiner

SPOKEN DIALOGUE SYSTEM, A SPOKEN DIALOGUE METHOD AND A METHOD OF ADAPTING A SPOKEN DIALOGUE SYSTEM

CROSS-REFERENCE TO RELATED APPLICATIONS

This application is based upon and claims the benefit of priority from prior United Kingdom Application number 1701918.3 filed on Feb. 6, 2017, the entire contents of which are incorporated herein by reference.

FIELD

The present disclosure relates to a spoken dialogue system, a spoken dialogue method and a method of adapting a spoken dialogue system.

BACKGROUND

Spoken dialogue systems (SDSs) are used in many applications, including automated call centres, assistive technology, speech-driven interactive mobile applications, speech interface for wearable devices and human-robot interactions for example, and are intended to verbally interact with humans. Other applications include financial services, phone banking, education, assistive living, call-centers, intelligent virtual agents, video games, commercials, healthcare and car navigation.

There is a continuing need to improve the functioning of SDSs, whilst reducing the training, maintenance and human design input needed for such systems.

BRIEF DESCRIPTION OF THE DRAWINGS

Systems and methods in accordance with non-limiting arrangements will now be described with reference to the accompanying figures in which.

DETAILED DESCRIPTION

Figure 1A:
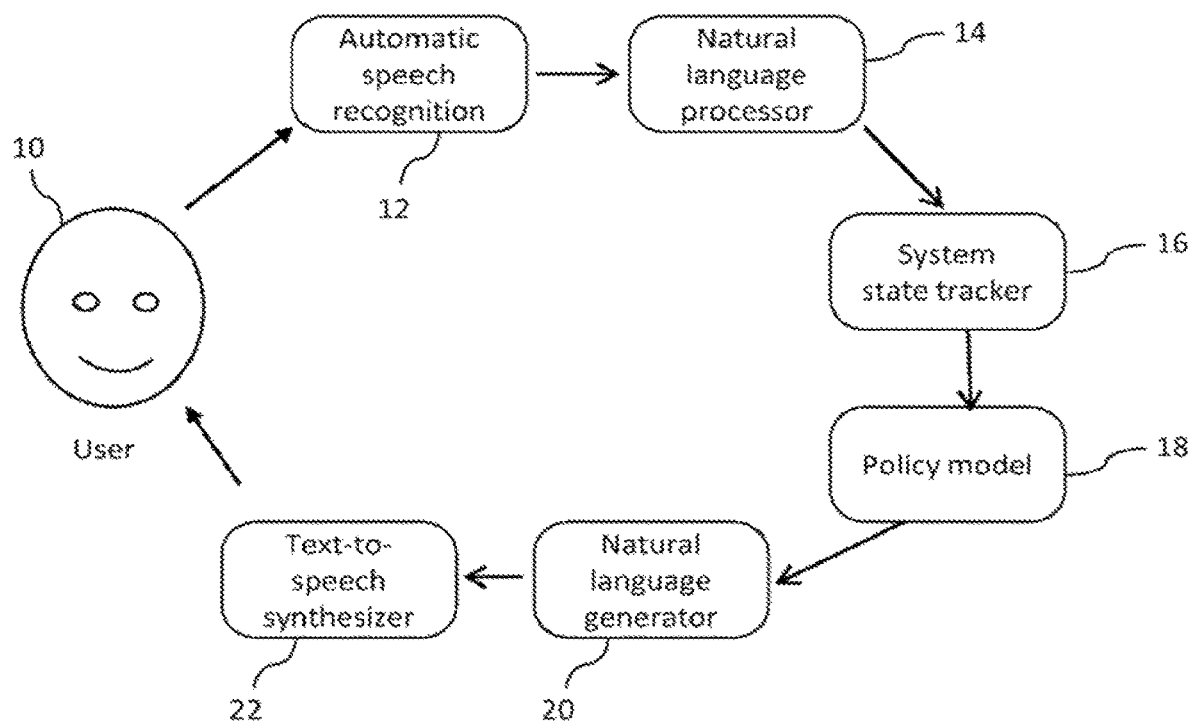
FIG. 1(a) is a schematic illustration of a spoken dialogue system.

A spoken dialogue system is provided, comprising:
an input for receiving data relating to speech signals originating from a user, where the speech signals form part of a dialogue;
an output for outputting information specified by an action; and
a processor configured to:
extract one or more acoustic features from the input speech signal;
determine an action using a dialogue model, wherein the input to the dialogue model is generated using the input speech signal;
output information specified by the action at the output;
generate a success measure using the acoustic features.

The success measure may be generated using a stored and trained classifier. A feature vector is generated using the acoustic features, and inputted into the classifier, wherein the classifier is configured to output a success measure. A plurality of different success measures may be generated, each being optionally generated by a separate classifier. A single success measure may be generated from the plurality of success measures.

The success measure may be inputted into the dialogue model. For example, the success measure may be included in a feature set inputted into the dialogue model.

The dialogue model may comprise a policy model and a state tracker model, wherein the processor is further configured to:
update a system state based on the input speech signal using the state tracker model;
update the system state to include a success measure;
wherein the updated system state is the input to the policy model.

The input speech may be converted to one or more language understanding hypotheses and these may be inputted into the state tracker model for example.

The system state may be a belief state. In this case, the state tracker model is a stored and trained model configured to update a first set of the beliefs based on the input speech. Any remaining beliefs in the belief state may relate to the success measure, and these may be updated using the output of the classifier. Additionally, some of the remaining beliefs may be updated directly from the extracted acoustic features for example.

The feature vector which is inputted into the classifier may further comprise features extracted from the system state updated based on the input speech signal. For example, one or more of the first set of beliefs may be included in the feature vector. Alternatively, features may be extracted from the one or more of the first set of beliefs and included in the feature vector.

There is also provided a spoken dialogue system comprising:
an input for receiving data relating to speech signals originating from a user, where the speech signals form part of a dialogue;
an output for outputting information specified by an action; and
a processor configured to:
extract one or more acoustic features from the input speech signal;

update a system state based on the input speech signal using a state tracker model, wherein the updated system state comprises the one or more acoustic features;

determine an action using a policy model, wherein the input to the policy model is the updated system state;

output information specified by the action at the output.

For the spoken dialogue systems above, the output may be an output for outputting a speech signal and wherein outputting information relating to the action comprises:

generating text specified by the action;
converting the text to speech and outputting the speech signal at the output.

There is also provided a success evaluation system for use with a spoken dialogue system, comprising:

an input for receiving data relating to speech signals originating from a user, where the speech signals form part of a dialogue;

an output for outputting a success measure; and a processor configured to:
extract one or more acoustic features from the input speech signal;
form a feature vector using the acoustic features;
generate a success measure using the feature vector as input to a classifier, wherein the classifier is configured to output a success measure of the dialogue.

There is also provided a spoken dialogue method comprising:

extracting one or more acoustic features from an input speech signal originating from a user, where the speech signals form part of a dialogue;

determining an action using a dialogue model, wherein the input to the dialogue model is generated using the input speech signal;

outputting information specified by the action at the output;

generating a success measure using the acoustic features.

There is also provided a spoken dialogue method comprising:

extracting one or more acoustic features from the input speech signal originating from a user, where the speech signals form part of a dialogue;

updating a system state based on the input speech signal using a state tracker model, wherein the updated system state comprises the one or more acoustic features;

determining an action using a policy model, wherein the input to the policy model is the updated system state;

outputting information specified by the action at the output.

There is also provided a method of adapting a spoken dialogue system, the method comprising:

extracting one or more acoustic features from the input speech signal;

determining an action using a dialogue model, wherein the input to the policy model is generated using the input speech signal;

outputting information relating to the action at the output;

generating a success measure using the acoustic features;

adapting the dialogue model to increase the performance indicator.

The method may be performed by using the system repeatedly to run through dialogues with a human or a simulated human user and providing a performance indicator, wherein each dialogue comprises a plurality of speech signals originating from the user. Alternatively, the method may be performed by using stored data comprising spoken dialogues between a human or a simulated human user and a spoken dialogue system.

The performance indicator may be generated using the success measure.

The dialogue model may comprise a policy model. The performance indicator may be a reward value generated using a reward function, wherein the reward function is a function of the success measure.

The reward function may also be a function of one or more of the acoustic features.

A feature vector may be generated using the acoustic features extracted from the speech signal, and inputted into a classifier, wherein the classifier is configured to output a success measure. The output of the classifier may be converted to a binary or discrete measure. There may be a plurality of classifiers, each generating a different success measure. These may be combined to form a single measure which is included in the reward function.

The reward value may be calculated once for each dialogue. The acoustic features for one or more speech signals in the dialogue may be used to generate the success measure.

The processor may be further configured to update a system state based on the input speech signal using the state tracker model, wherein the updated system state is the input to the policy model, wherein the updated system state comprises the success measure.

There is also provided a method of adapting a classifier model to generate a success measure from data comprising spoken dialogues between a human or a simulated human user and a spoken dialogue system, the data comprising success measures, the method comprising:

extracting one or more acoustic features from the input speech signal;

generating a success measure using the acoustic features as input to the classifier;

adapting the classifier using the success measures in the data.

The data may be stored data or the classifier may be trained whilst by using the spoken dialogue system repeatedly to run through dialogues with a human or a simulated human user.

There is also provided a method of adapting a spoken dialogue system, the method comprising:

extracting one or more acoustic features from the input speech signal;

updating a system state based on the input speech signal using a state tracker model, wherein the updated system state comprises the one or more acoustic features;

determining an action using a policy model, wherein the input to the policy model is the updated system state;

output information relating to the action at the output;

adapting the policy model to increase the performance indicator.

The method may be performed by using the system repeatedly to run through dialogues with a human or a simulated human user and providing a performance indicator, wherein each dialogue comprises a plurality of speech signals originating from the user. Alternatively, the method may be performed by using stored data comprising spoken dialogues between a human or a simulated human user and a spoken dialogue system.

The acoustic features may be one or more of an indication of energy of the input speech signal, an indication of the pitch of the input speech signal and spectral information for the input speech signal.

The acoustic features for the input speech signal may be generated using other speech signals in the dialogue. For example, the acoustic features may include a difference between an acoustic feature for the current speech signal and the acoustic feature for one or more other speech signals in the dialogue. They may include a summary value of the acoustic feature for the current speech signal and the acoustic feature for one or more other speech signals in the dialogue, for example a mean value.

The acoustic features extracted for one or more speech signals may be combined, and the combined acoustic features used to generate the success measure. For example, the acoustic features may be summarised, compared or concatenated for two or more of the speech signals in a dialogue.

The success measure may be a binary or discrete success measure. The success measure may be generated using the output of one or more classifiers. The success measure may comprise one or more of a measure of subjective dialogue success, a measure of interaction naturalness, a measure of objective dialogue success, and a measure of total dialogue length. The measure of total dialogue length may be a measure of the number of dialogue turns for example.

There is also provided a carrier medium comprising computer readable code configured to cause a computer to perform any of the above described methods.

Since some methods in accordance with embodiments can be implemented by software, some embodiments encompass computer code provided to a general purpose computer on any suitable carrier medium. The carrier medium can comprise a storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

FIG. 1(a) is an overview of an example of a SDS general architecture. Spoken dialogue systems may comprise a number of components to, for example, convert speech from a human user 10 into text (automatic speech recognition 12), identify and collate semantic information (natural language processor 14), update a system state (system state tracker 16), generate an output action (policy model 18), generate the necessary text specified by the action (natural language generator 20) and synthesize speech (text to speech synthesizer 22). Each of these components may be a stored and trained model. Alternatively, one or more of the components may be replaced by a single stored and trained model. Alternatively, a SDS may comprise a single model which takes the input speech and maps to output actions or output speech. This model may be a neural network for example.

Figure 1B:
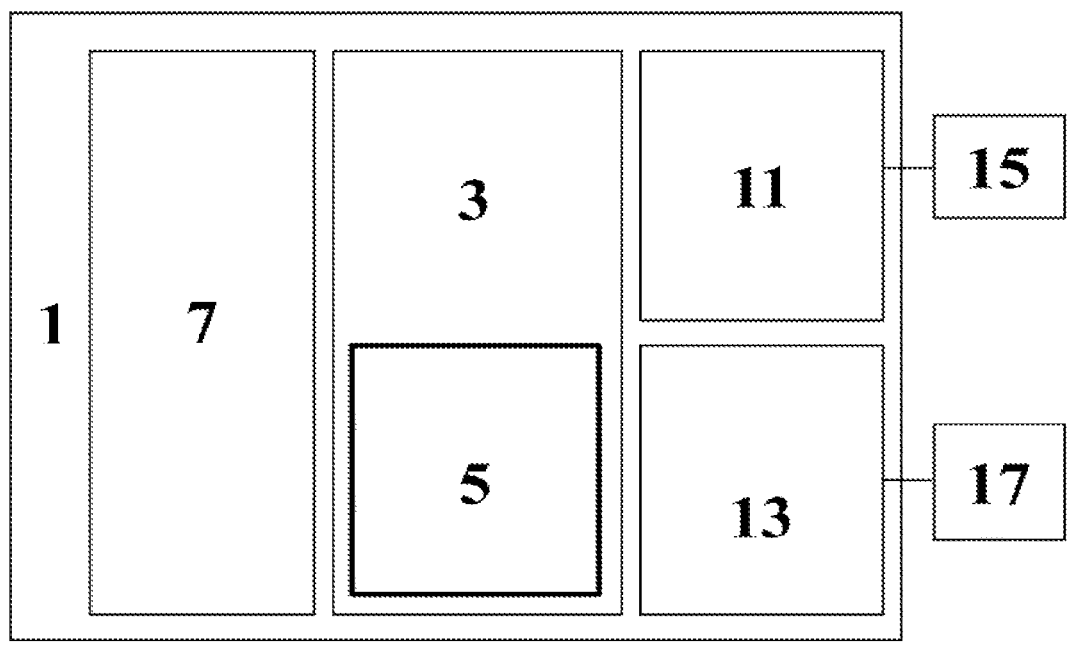
FIG. 1(b) is an overview of an example SDS architecture.

FIG. 1(b) is a schematic illustration of an SDS 1. The SDS 1 may be an information retrieval SDS for example. The system 1 comprises a processor 3, and takes inputs which are speech signals. The system may also output a semantic representation, text or speech signals, or other output information, for example instructions to a device to perform a task. The processor may be a dialogue manager and may implement a policy in order to determine the actions to be taken by the SDS 1.

A computer program 5 is stored in non-volatile memory. The non-volatile memory is accessed by the processor 3 and the stored computer program code is retrieved and executed by the processor 3. The storage 7 stores data that is used by the program 5.

The system 1 further comprises an input module 11. The input module 11 is connected to an input 15 for speech signals. The input 15 may be an interface that allows a user to directly input speech signals, for example a microphone. Alternatively, the input 15 may be a receiver for receiving speech signals from an external storage medium or a network.

The system 1 may further comprise an output module 13. Connected to the output module 13 may be an output 17. The output 17 may be an interface that provides data to the user, for example a screen, headphones or a speaker. Alternatively, the output 17 may be a transmitter for transmitting data to an external storage medium or a network. Alternatively, the output 17 may provide instructions to another device or part of a device.

In use, the system 1 receives speech signals through the input 15. The program 5 is executed on processor 3 in the manner which will be described with reference to the following figures. It may output a text or speech signal at the output 17. The system 1 may be configured and adapted in the manner which will be described with reference to the following figures.

Acoustic features from the input speech signals may be used in SDS by an automatic speech recognition (ASR) model 12, to transcribe the speech signals for example. However, in the methods and systems described in relation to the following figures, one or more acoustic features are also used by the policy model 18 to generate output actions, or to adapt the policy model 18 for example. These one or more acoustic features may comprise the same acoustic features that are extracted for speech recognition, and/or different acoustic features. Although in the following, examples of the use of the acoustic features by a policy model 18 are described, it is to be understood that the acoustic features may also be used by a model which replaces the policy model 18 and one or more of the other components shown in FIG. 1(a) in a similar manner. For example, where the SDS comprises a neural network which replaces the policy model and one or more of the other components shown in FIG. 1(a), the acoustic features may be used as input to the neural network during implementation, or to generate a performance indicator to train the neural network during training, in a similar manner.

The acoustic features may comprise one or more of pitch, energy, filterbank features, other spectral features, jitter (a measure of the cycle-to-cycle variation of fundamental frequency) and shimmer (a measure of the cycle-to-cycle variation of amplitude).

The one or more acoustic features may be the Root Mean Square (RMS) and/or the pitch of the input speech signals in the dialogue for example.

Each dialogue comprises a succession of user utterances $u(t)$, with $t=1 \ldots N$, t denoting the turn number, and N denoting the total number of turns.

A single set of one or more acoustic features may be generated for each dialogue. Generating the one or more acoustic features for the dialogue may comprise extracting a feature set comprising acoustic features for each input utterance in the dialogue, and then generating a single feature set at the end of the dialogue using the feature sets from all of the input utterances. For example, summary statistics can be used to generate the single feature set for the dialogue, where summary statistics may comprise one or more of: mean, median, minimum and maximum value, standard deviation, skewness, 90th percentiles, and kurtosis for example. Alternatively, the features from each utterance can be concatenated into a single feature set.

For example, the set of acoustic features generated for the dialogoue may comprise one or more of: mean RMS ($\mu_{RMS}$), mean pitch ($\mu_p$) (where the pitch for one utterance may in fact be a mean of the pitch values for that utterance, therefore "pitch" may refer to "mean pitch for the utterance" and "mean pitch" then refers to the mean of these mean values for e.g. all utterances in the dialogue), standard deviation of RMS ($\sigma_{RMS}$), standard deviation of pitch ($\sigma_P$), pitch range ($r_p$), difference between RMS values in consecutive utterances ($\delta_{RMS}$), difference between pitch values in consecutive utterances ($\delta_p$) (where again "pitch" here may refer to a mean pitch value for the utterance), the mean of the derivative of the pitch $$\left(\mu_{\frac{dp}{dt}}\right),$$

and mean values for each of a plurality of frequency bands, for example mean Mel-frequency cepstral coefficient (MFCC) values (again for each utterance, a mean value for each MFCC may be extracted, therefore "MFCC values" may refer to "mean MFCC values for the utterance" and "mean MFCC values" then refers to the mean of these mean values for e.g. all utterances in the dialogue. Alternatively, instead of using summary statistics such as the mean of the values over the dialogue, the MFCCs for a dialogue can be converted to a "feature image". For example, for each utterance, a mean value for each MFCC component is taken, in other words an average over time. There may be 13 MFCCs for each utterance. A "feature image" is then created by creating a matrix of the 13 mean MFCCs per utterance, for each turn in the dialogue.

These features can be generated from acoustic features extracted from every utterance in the dialogue. Alternatively, only one or more of the utterances in the dialogue may be used, e.g. the first, middle or last M utterances, where M is an integer greater than or equal to 1 and less than or equal to N. For example, the matrix of MFCCs may comprise only the first 5 turns. Accordingly, the "feature images" have a size of 13×5.

In this case, P acoustic features are extracted for each u(t). Further K audio features may be extracted for each u(t) to capture the temporal evolution between u(t) and one or more of the other previous utterances in the dialogue. For example, the difference between values of the acoustic features for consecutive utterances may be extracted. The temporal structure of utterances is informative of changes in the user's internal state. By extracting these features as well, the context is also taken into account. There are P audio features that come from one utterance (such as RMS), for which summary statistics or concatenation may be used to generate the feature set for the dialogue. There are K audio features that come from comparison of the features of that utterance and one or more other utterances, e.g. consecutive utterances (such as RMS between the current utterance and the previous utterance), for which summary statistics or concatenation may also be used to generate the feature set for the dialogue. All of the summary features may form one feature vector of length P+K for the dialogue for example.

Alternatively, instead of generating a single feature set for each dialogue, a feature set of acoustic features may be extracted and used for each utterance in the dialogue. Extracting the one or more acoustic features for an utterance may comprise extracting a feature set comprising one or more of: RMS, pitch, difference between current RMS value and RMS value for previous utterance or utterances, difference between current pitch value and pitch value for previous utterance or utterances, the derivative of the pitch, and values (e.g. mean values) for each of a plurality of frequency bands (for example MFCC values). Summary statistics can also be used to generate features using the previous utterances. The set of acoustic features for the utterance may thus additionally or alternatively comprise one or more of: mean RMS ($\mu_{RMS}$) of current and previous utterances, mean pitch ($\mu_p$) of current and previous utterances, standard deviation of RMS ($\sigma^{RMS}$) of current and previous utterances, standard deviation of pitch ($\sigma_P$) of current and previous utterances, pitch range ($r_p$) from current and previous utterances, the mean of the derivative of the pitch ($\mu_{dp/dt}$) of current and previous utterances, and mean values for each of a plurality of frequency bands (for example mean MFCC values) of current and previous utterances.

In this case, P acoustic features are extracted for each u(t). Further K audio features may be extracted for each u(t) to capture the temporal evolution between u(t) and one or more of the other previous utterances in the dialogue. For example, for t=3, the difference between the acoustic feature for utterance u(3) and each of utterance u(1) and u(2) may be extracted, or the mean of the RMS values for utterances u(3), u(2) and u(1) may be extracted. There are P audio features that come from one utterance (such as RMS). There are K audio features that come from the current utterance together with one or more previous utterances (such as RMS between the current utterance and the previous utterances). All of these features may form one feature vector of length P+K for each input utterance.

The RMS for one utterance u(t) may be computed using the equation:

$$RMS_{u(t)} = \sqrt{\frac{1}{L}\sum_{i=1}^{L} x_{u(t)}(\tau)^2}$$

where $x_{u(t)}(\tau) = \{x(1), \ldots, x(L)\}$ is the speech signal corresponding to the utterance u(t), where $\tau$ is the frame index for the speech signal of utterance $x_{u(t)}(\tau)$ and L is the total number of frames in the speech signal.

Pitch information may be extracted in various ways. One example is using the autocorrelation method, in which the autocorrelation function below is used:

$$r_\tau(d) = \frac{1}{W}\sum_{j=\tau+1}^{\tau+W} x(j)x(j+d)$$

where d is a time lag, and W is a window size. The $r_\tau(d)$ function has a series of global maxima at zero, and then at all multiples of the pitch period. The pitch period may be determined by scanning this pattern. It can be estimated by the location of the first global maximum with non-zero abscissa. A number of pitch values are returned for each utterance u(t), and the mean of these values may be used as the pitch value for u(t).

For example, the set of acoustic features may comprise the MFCCs and pitch.

Audio features that can be used to indicate the users internal state are extracted, for example each time a new input utterance is received. The use of these audio features in relation to an SDS system will be described below.

Figure 2:
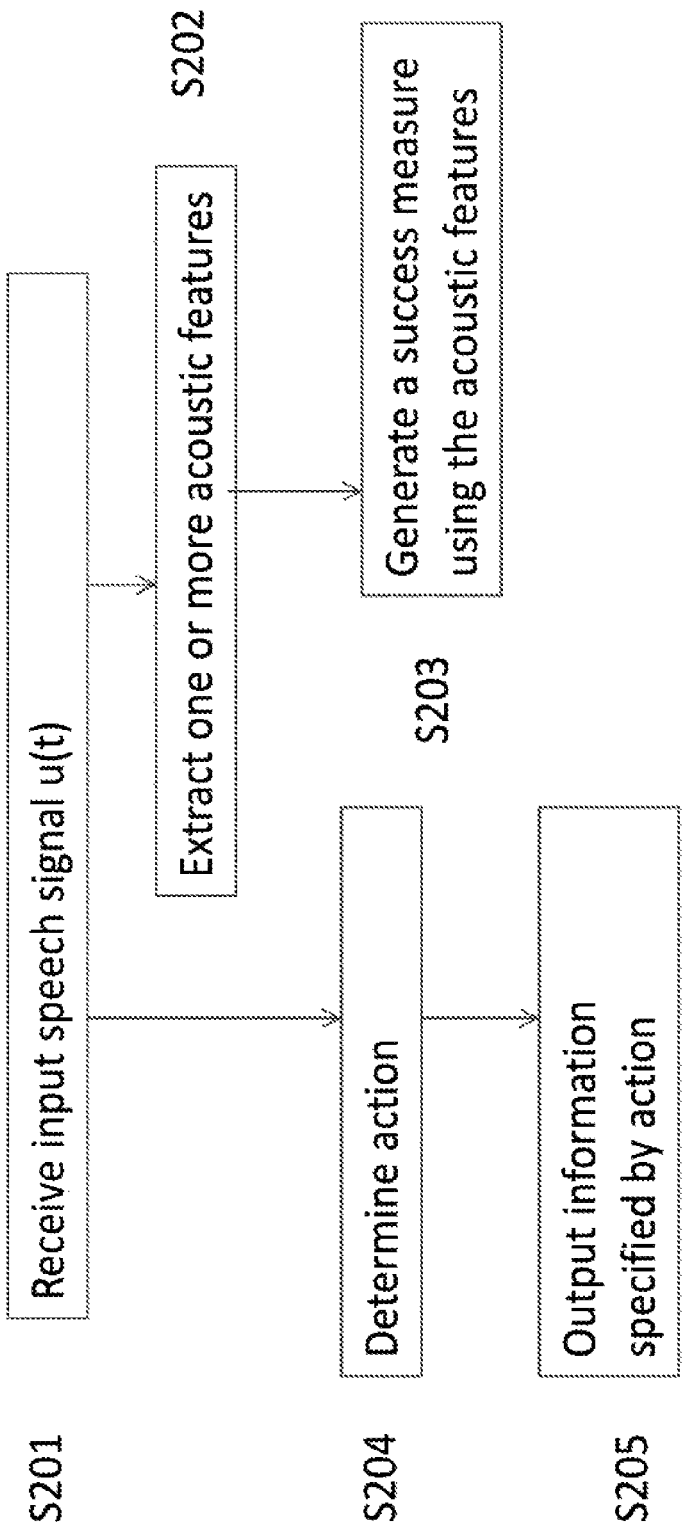
FIG. 2 is a flow chart showing an example method performed by a spoken dialogue system during implementation, in which a success measure is generated using acoustic features.

FIG. 2 is a flow chart showing an example method performed by the spoken dialogue system during implementation, in which a success measure is generated using acoustic features.

In step S201, an input speech signal u(t) is inputted. The input speech signal forms part of a dialogue between a user and the SDS.

In step S202, one or more acoustic features are extracted from the input speech signal. Examples of acoustic features which may be extracted in this step have been described above.

In step S203 a success measure is generated using the acoustic features.

Optionally, the success measure is generated by a classifier, which is trained prior to implementation of the system and stored. Training of the classifier will be described in more detail below. The trained classifier may be configured to receive a feature vector for each input utterance u(t), the feature vector being generated using the acoustic features extracted from the speech signal in S202. The classifier may be configured to output one or more success measure values for each input utterance u(t).

The success measure may comprise one or more of: a measure of subjective dialogue success, a measure of interaction naturalness, a measure of objective dialogue success, and a measure of total dialogue length (e.g. a measure of the number of dialogue turns, an indication of whether the dialogue length is less than the mean length of successful dialogues prior to implementation or not). A plurality of classifiers may be used, each generating a different success measure value, for example a first classifier generates a measure of subjective dialogue success, a second classifier generates a measure of interaction naturalness, a third classifier generates a measure of objective dialogue success, and a fourth classifier generates a measure of total dialogue length. Each classifier may take different features as input.

A measure of subjective dialogue success refers to a measure of whether the user considers the dialogue successful. For example, in an information retrieval SDS, a measure of subjective dialogue success may be whether the user considers that they found the information they were looking for. This could be a binary measure (e.g. yes/no), or measured on a discrete scale (e.g. a 6-point Likert scale) for example.

A measure of interaction naturalness refers to how well the user considers the dialogue to understand them. For example, this could be a binary measure (e.g. yes/no) or measured on a discrete scale.

A measure of objective dialogue success is a measure of whether the user succeeded in fulfilling their goal.

A measure of dialogue length may be a measure of the number of dialogue turns, and may also be binary (e.g. low/high, lower/higher than a benchmark value) or a continuous scale.

A binary success measure may be generated from one or more of the above metrics (for example successful/not successful).

The above are some examples of success measures, however, other success measures may alternatively or additionally be generated by one or more classifiers in this step and used.

The success measure is generated by inputting acoustic information into a classifier. The classifier is trained to predict the success measure of the dialogue from the acoustic features. In general, the success of the dialogue and the acoustic features are considered to be related, for example, slow-rate speech can be indicative of a user who is not very much engaged in the dialogue.

The classifier may be a support vector machine, Gaussian process regressor, hidden markov model based, neural network (swallow or deep, for example convolutional neural network), Bayesian classifier, discriminant analysis based classifier or random forest based classifier for example.

Thus in S203, low level audio descriptors extracted in S202 are used as input to a classifier, to predict metrics that are constituents of user satisfaction from acoustic features.

In S204, a dialogue model is used to determine an action wherein the input to the dialogue model is generated using the input speech signal. The dialogue model is also trained prior to implementation of the system and stored. The dialogue model may be a policy model 18 as has been described previously; in which case several further components may be used to generate the input to the policy model 18 from the speech signal. Alternatively, where the SDS comprises a single neural network based model, the input may simply be the speech signal for example. Training of the dialogue model will be described later. The output of the classifier in S203 may also be used as part of the input to the dialogue model in S204. The dialogue model outputs an action. Information specified by the action is then output in S205. In S205, information specified by the action determined in S204 is outputted at the output.

A specific example of this step for a POMDP based SDS having an architecture such as shown in FIG. 1(a) is now described in more detail below in relation to FIG. 3. However it is to be understood that other systems may be used, for example Markov decision process speech dialogue systems (MDP-SDS) or neural network based systems.

Figure 3:
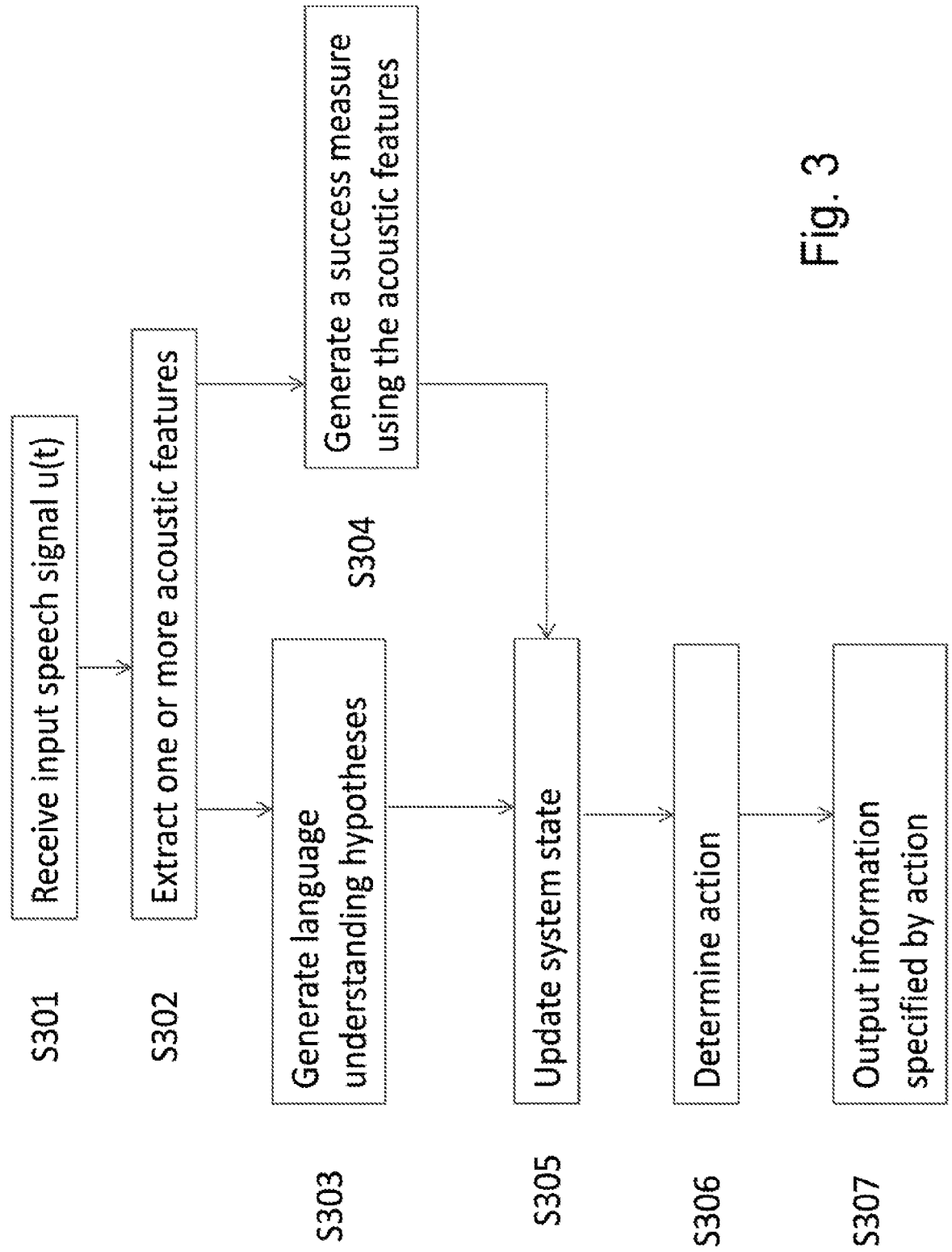
FIG. 3 is a flow chart showing an example method performed by a spoken dialogue system during implementation, in which the success measure is part of a system state.

FIG. 3 is a flow chart showing an example method performed by the spoken dialogue system during implementation, using a system state tracker model 16.

Steps S301 and S302 correspond to steps S201 and S202 described above.

In step S303, one or more language understanding hypotheses are generated using the input speech signal. This may comprise performing ASR to generate a text signal from the input speech and natural language processing, to generate an n-best list of language understanding hypotheses with associated probabilities from the text signal. The language understanding hypotheses may be generated using the one or more acoustic features extracted in S302, and/or using other acoustic features extracted from the speech signal as part of S303.

Step S304 corresponds to step S203 described above.

In S305, the language understanding hypotheses generated from the input utterance and the success measure generated in S304 are inputted into a state tracker model 16. The state tracker model 16 outputs an updated system state. The system state may also be referred to as a dialogue state. The tracker model 16 may be an intent recognition model. The text and associated probabilities generated in S303 are inputted into the tracker model, together with the success measure generated in S304. The system state may track, comprise or be determined by all of the preceding inputs to the system made by a user in the dialogue sequence. It may therefore provide a full dialogue history and context.

The system state may comprise probability values associated with each of a plurality of possible values for each of a plurality of categories. The categories may be slots, for example in a task-oriented spoken dialogue system. Each slot is associated with two or more values, where a value is a possible valid response that the dialogue manager can recognise in relation to a slot. For example, a slot may be "price" and possible values may be "low", "mid", and "high". In some cases, a slot may have the possible values "provided" and "not provided".

The state tracker model may be a POMDP based model, and the system state in this case is a belief state. A belief state may comprise or represent some or all of the system's observations in the dialogue sequence, wherein an observation is an input to the system. The following example will be described for a system which uses a POMDP based belief state tracker model, however it is to be understood that other systems may be used, for example MDP-SDS.

In this case, in S305, for an input speech signal u(t) in the dialogue, a belief state is updated, giving $B_t(S)$. The belief state at time t, $B_t(S)$, comprises a vector $b_s$ of the beliefs with respect to each slot s. The belief with respect to a slot s may be the set of the probabilities that the slot has each possible value. For example, for the slot price, the values and probabilities may be: [empty: 0.15, cheap: 0.35, moderate: 0.1, expensive: 0.4]. These probabilities are updated by the tracker model 16 at each turn t based on the new input utterance. The belief tracker model 16 is a stored trained model that maps the input utterance to slot values, and updates the probabilities accordingly.

The belief state may also comprise joint beliefs, which are probability distributions over the values of more than one slot, e.g. price and location (the probability that the user said both cheap restaurant and centre of town). These are also updated by the belief tracker model 16 (in the same manner as the slot-wise beliefs, or based on the generated slot-wise beliefs for example).

The belief state also comprises slot independent beliefs. The slot independent beliefs may comprise beliefs that relate to the dialogue history for example.

The slot independent beliefs also comprise the success measure generated in S304. In this method, the success measures generated in S304 are used to augment the belief state.

If a plurality of success measures are generated, each may be included in the belief state separately, or a combined success measure (yes/no) may be generated from the plurality of success measures and included.

Instead of or in addition to the success measure, acoustic features may be included directly in the belief state. In this case, S304 may be omitted, and the acoustic features outputted from S302 are inputted directly into the belief state in S305. For example, one or more of the standard deviation of the RMS from the current and previous utterances, maximum value of RMS from the current and previous utterances, difference in the RMS skewness between two consecutive turns, and difference in the max pitch value between two consecutive turns are included directly in the belief state.

The success measure beliefs and/or acoustic feature beliefs are updated directly with the output of the classifier and/or acoustic feature extraction. Thus the output values of the classifier in S304 and/or the acoustic feature extracted in S302 are inputted directly into the belief state. For example, the classifier may output a value of "1" for the success measure "naturalness" in S304, and the value "1" is inserted for the "slot" "naturalness" in the belief state in S305. Thus, unlike for the slot wise beliefs, the belief tracker model is not trained to generate the belief values for the success measure and/or acoustic feature beliefs. These are generated in the previous steps and the values simply included in the belief state.

Optionally, system state updated in S305 may be "summarised". A summary system state comprises the possible value corresponding to the highest probability value only for each category. It also contains the slot independent beliefs, including the success measure and/or acoustic features. S305 may comprise a further step of summarising the beliefs.

At least a part of the updated system state is then inputted into the policy model, which determines an action in S306. The at least part of the updated system state may be the summary system state for example. In S306, an action is determined by inputting the updated system state outputted from S305 (which may be a summary system state) and a stored ontology into a policy model 18.

The policy model 18 is trained prior to implementation to output an action based on an input system state and stored ontology, the stored ontology comprising actions.

A full system action a can take one of the following forms: a( ) (e.g. reqmore( ), hello( ), thankyou( ), etc.); a(s) (e.g. request(food)); a(s=v) (e.g. confirm(area=north)); a(s=$v_1$s=$v_2$) (e.g. select(food=Chinese, food=Japanese)); and a($s_1$=$v_1$, $s_2$=$v_2$, ..., $s_n$=$v_n$) (e.g. offer(name="Peking Restaurant", food=Chinese, area=centre)). Here a is the action function, e.g. a communicative function, and $s_x$ and $v_x$ denote slots and values respectively defined by the domain ontology. The full system actions in the stored ontology may be inputted into the policy model. Alternatively, the full system actions are simplified to "summary" actions before being input into the policy model. The actions can be "summarized" by representing them as a(s=$b^{top}_s$), a(s=$b^{top}_s$; s=$b^{sec}_s$), or a(s=$b^{top}_{joint}$), accordingly, where $b_s$ denotes the marginal belief with respect to slot s, $b^{top}_s$ and $b^{sec}_s$ are the top and second beliefs for state s and $b_{joint}$ is the joint belief consisting of multiple slot-value hypotheses. After this abstraction, summary actions can be defined as $a_s$ (for those actions depending on s) and a (for those who do not have any arguments or take a joint hypothesis as its arguments, i.e. independent of any particular slot).

The policy may determine an action by means of a stored probability distribution over which actions might be taken. In a POMDP system, the summary belief states comprise slot-value pairs. The dialogue policy model is optimised prior to implementation by estimating the expected long-term reward for a system action a being executed at a belief state B, such that the action with maximum expected reward is then selected at each dialogue turn during implementation.

When summary actions are used, the policy model selects a summary action, and this can then be mapped back to the full system action space, by consulting the current belief state (and in some cases the domain ontology). For example, the summary action may be in the form "inform_location", and the full action, of the form "inform(location=centre)" may be generated by retrieving the top value for the slot "location" in the belief state.

In S307, information specified by the output action is outputted. For example, text specified by the action may be generated using natural language generation and then a text to speech synthesizer used to synthesize speech, which is then outputted.

Figure 4:
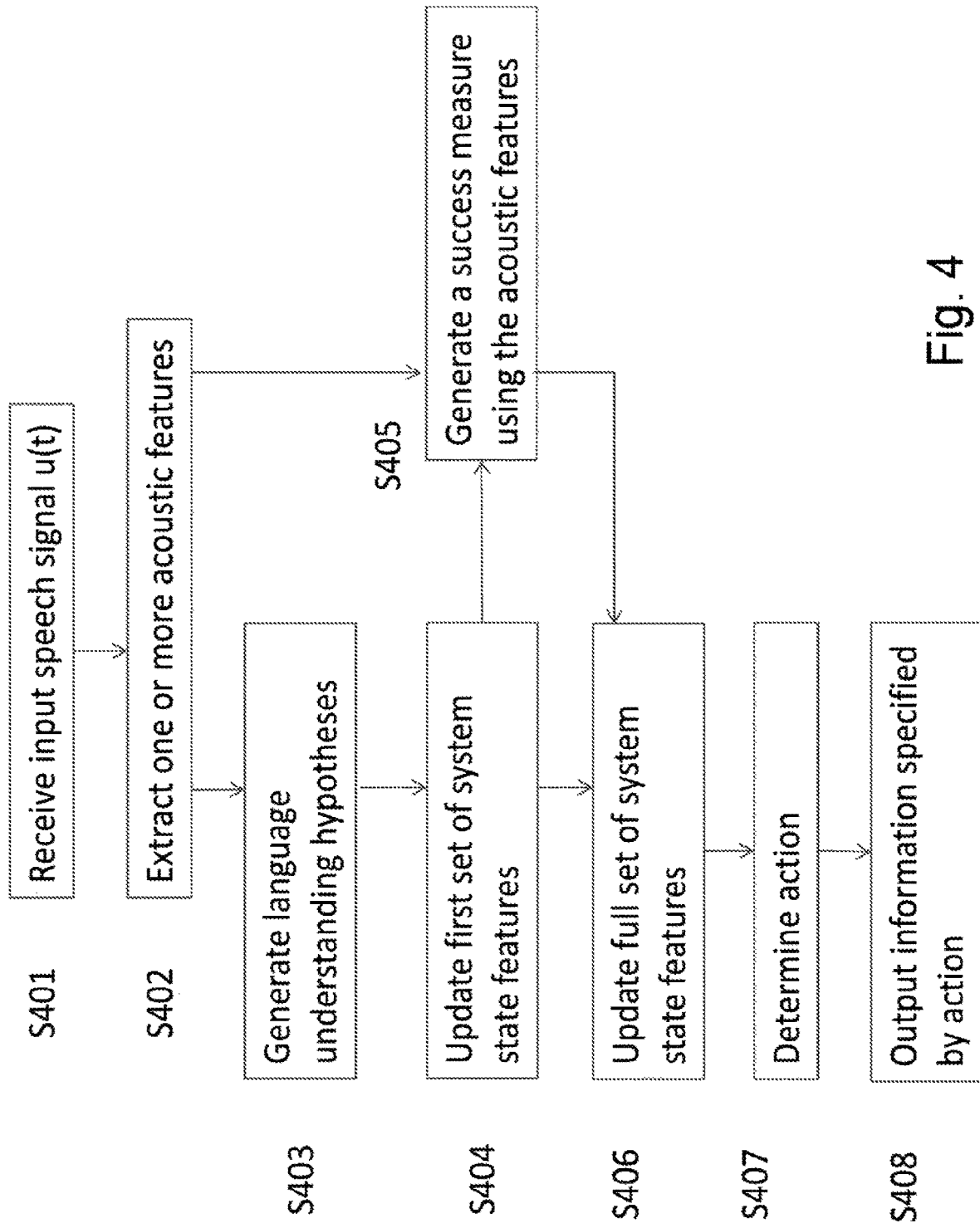
FIG. 4 is a flow chart showing an example method performed by a spoken dialogue system during implementation, in which a first set of updated system state features are also used to generate the success measure.

FIG. 4 is a flow chart showing an example method performed by the spoken dialogue system. The method is similar to that shown in FIG. 3, however in this method a first set of updated system state features are also used to generate the success measure, before the success measure is then inputted back into the system state to generate the full updated system state.

Steps S401 to S403 correspond to steps S301 to S303 described above.

Again, the state tracker model may be a POMDP based model, and the system state in this case is a belief state. The following example will be described for a system which uses a POMDP based belief state tracker model, however it is again to be understood that other systems may be used, for example MDP-SDS or neural networks.

In S404, for an input speech signal u(t) in the dialogue, a first set of beliefs in the belief state are updated. These beliefs may comprise the vector $b_s$ of the beliefs with respect to each slot s, the joint beliefs and slot independent beliefs other than the success measure belief or beliefs. The success measure belief or beliefs are not updated at this stage. The other beliefs are updated in the same manner as described in relation to S305, i.e. using a belief state tracker model. The step of updating the success measure belief or beliefs with the value or values output from the classifier in S304 is not performed however.

One or more of these updated beliefs (the beliefs with respect to each slot s, the joint beliefs and slot independent beliefs other than the success measure beliefs) are then incorporated into the feature vector which is inputted to the classifier to generate a success measure in S405. The one or more of these updated beliefs are referred to as the first set of belief state features. Additionally or alternatively, features generated using the first set of belief state features may be included in the feature vector. The success measure is generated by a classifier in a similar way as described in relation to S304, however the input feature vector comprises features from the first set of belief state features, and/or features generated using features from the first set of belief state features, as well as the acoustic features.

The belief state features may comprise information about one or more of the user's dialogue act (i.e. the last input of the user, for example to request an area or to select a price range), the system's summary act (i.e. the last action performed by the system), current turn number and belief state information with respect to a slot or slots (joint beliefs). The belief state information may comprise the full belief for a particular slot or the entropy of each slot in the belief state for example.

For example, one or more of the following acoustic features and belief state features may be inputted into the classifier in order to output the success measure: mean of current and previous RMS values, standard deviation of current and previous RMS values, mean of current and previous derivative of RMS values, mean of current and previous pitch values, standard deviation of current and previous pitch values, mean of current and previous derivative of pitch values, range between current and previous pitch values, difference of pitch values in consecutive turns, top user dialogue act, entropy of belief state slots, last system summary act, current turn number.

The two feature sets (acoustic features and belief state features) capture different kinds of information—relevant to how the user said something (acoustic features) and what the user said (belief state features). A joint feature vector, constructed as the concatenation of the acoustic features and the belief state features is used to generate the success measure in this example.

Once the success measure is generated, the success measure belief or beliefs in the belief state are updated in S406. In other words, the full updated belief state is generated, which includes the updated first set of features and the updated success measure features.

The or part of the updated belief state is then inputted into the policy model and an action is determined in S407. The part of the updated belief state may be a summary state for example. S407 and S408 are performed in the same way as S306 and S307.

Although in the above described methods, acoustic features have been extracted and used for each input utterance, alternatively a single set of one or more acoustic features may be generated for each dialogue, using summary statistics. The success measure is then generated at the end of the dialogue, and not each time an utterance in inputted. Thus the summary acoustic features are inputted into the classifier once, at the end of the dialogue. This can be used during implementation of the spoken dialogue system to monitor performance of the spoken dialogue system for example.

Figure 5:
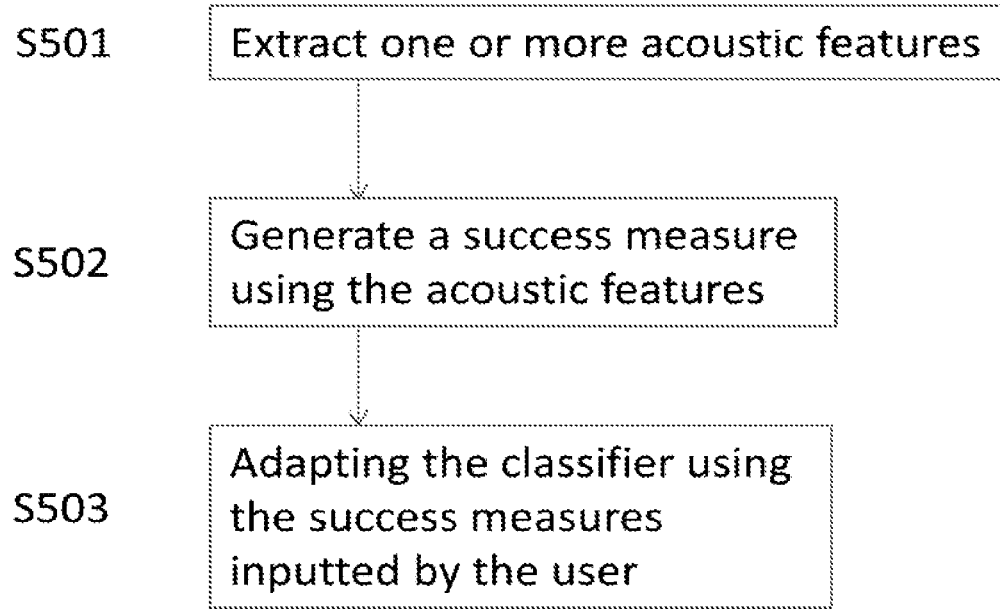
FIG. 5 shows a flow chart of an example method of training a classifier to generate a success measure.

FIG. 5 shows a flow chart of an example method of training a classifier to generate a success measure. A plurality of classifiers may be trained, each generating a different success measure value, for example a first classifier may be trained to generate a measure of subjective dialogue success, a second classifier may be trained to generate a measure of interaction naturalness, a third classifier may be trained to generate a measure of objective dialogue success, and a fourth classifier may be trained to generate a measure of total dialogue length. Each classifier may be different, and may be trained on the same or different data.

Once trained, the classifier can be used in a SDS in the manner described above in relation to FIGS. 2 to 4, i.e. to generate a success measure in step S203, S304 or S405. The classifier can also be using in the method of training the policy model described below. The same set of features used for training the classifier should then be used as the input to the classifier during its use. For example, where the classifier is trained using inputted joint feature vectors, constructed as the concatenation of the acoustic features and the belief state features, joint feature vectors should also be used during implementation, as described in relation to FIG. 4 above for example.

The classifier may be trained using a corpus of data comprising spoken dialogues between a human or a simulated human user and a spoken dialogue system, the data being labelled with success measures, which may be inputted by the user for each utterance or each dialogue for example. Alternatively, it may be trained by using the classifier repeatedly to run through dialogues with a human or a simulated human user and providing the success measures at each utterance or for each dialogue for example. The below method is described for a stored training corpus, however training with a user can be performed in a similar manner.

The classifier is domain independent, so may be trained with SDS data relating to any dialogue topic and then used with a SDS for a different dialogue topic. However, in order to improve the performance of the classifier, it may be trained with the same type of spoken dialogue system for which it is intended to use the classifier, e.g. an information retrieval type spoken dialogue system.

If system state information is to be used as input to the classifier, the classifier is trained with a system state based SDS, for example a belief state based SDS.

S501 comprises extracting one or more acoustic features from the input speech signal. This step can be performed as described above in relation to S201 for example. The acoustic features extracted from each utterance in each dialogue can be inputted into the classifier directly in S502, or summary acoustic features for the entire dialogue can be generated, as has been described above.

S502 comprises generating a success measure using the acoustic features. The acoustic features are inputted into the classifier and a success measure is outputted. The success measure may be generated based on a stored probability distribution.

S503 comprises adapting the classifier or classifiers using the success measures inputted by the user. The success measures inputted by the user are used as ground truths. This step may comprise updating the stored probability distribution.

For example, the classifier may be a random forest based classifier, comprising a set of classification trees. For each tree node, a subset of the training parameter set is considered. Additionally, each tree considers a different random subset of the acoustic features. By this procedure, different trees have different training feature sets. The best split for each node of the tree may be determined according to the Gini's index criterion. This procedure is recursive, and continues until all of the records in a tree node belong to the same class.

An example adaptation of a random forest classifier for the case of objective success as the success measure is now described. On average there are be 30 nodes per tree. The number of acoustic features to select at random for each decision split is 7. All input features are sampled with replacement. The cost for misclassification is the same across the classes. The minimum observations per tree leaf is 1. Prior probability for each class is the empirical one. During testing every tree in the forest is traversed. The final decision is reached by combining the decision of each independent tree in a majority voting fashion.

The classifier or classifiers may be one or more of a support vector machine, Gaussian process regressor, neural network (for example convolutional neural network or recursive neural network), Bayesian classifier, discriminant analysis based classifier or random forest based classifier for example. The classifier may be updated using a training algorithm, for example . . . .

For example, where the classifier is a convolutional neural network, it may be adapted using a stochastic gradient descent optimization method with momentum. Adapting the classifier comprises optimising the weights for the neural network.

A convolutional neural network having the following network architecture may be used: an input layer of size 13×5, a convolution layer of 100 filters (or feature maps) of size 2×2, a rectified linear unit (RELU) layer, a pooling layer of size 4×2, a convolution layer of 100 filters of size 3×2, a RELU layer, a fully connected layer with an output size of 2, a softmaxlayer, and a fully connected layer with an output size of 2 (as is the number of classes).

Optionally, belief state features may also be extracted from the corpus of data, for example using a pre-trained system state tracker. These belief state features may be included in the input to the classifier and used to generate the success measure, as described in relation to FIG. 4 above.

An example of training a number of classifiers to generate success measures will now be described. The classifiers were trained using a dataset of spoken dialogues between humans and a dialogue system, collected through Amazon Mechanical Turk (AMT). The dataset comprised 1,456 dialogues (10,431 user utterances) between people and a statistical SDS. The interactions concerned finding appropriate Toshiba laptops, however the classifier is domain independent, and therefore interactions relating to any domain can be used to train the classifier. Each person was given a set of preferences, for example: "You want a laptop for business use that is in the mid weight range. Make sure you get the size of its hard drive, and its dimensions". This is the goal. The person then interacted with the dialogue system until the item was retrieved or until the person decided to hang up. At the end of each dialogue, people were asked to provide feedback by answering the following two questions:

Q1: Did you find all the information you were looking for?
Answer is on a 6-point Likert Scale.
Q2: The system understood me well.
Answer is Yes or No.

Q1 and Q2 were taken to be indicators of user satisfaction, i.e. were labels of the success measures inputted by the user. Q1 is an example of a measure of subjective dialogue success. Q2 is an example of interaction naturalness. A high mark in Q1 and a 'Yes' in Q2 indicated more satisfied users. As well as these, two objective metrics were computed for each dialogue: objective dialogue success and number of (dialogue) turns. The objective dialogue success is whether the user succeeded in fulfilling their goal (yes/no). Objective dialogue success can be determined by checking whether the goal given to each user during training is met at the end of the dialogue, e.g. by comparing the original goal of the user to the information returned by the system. Although these particular success measures were used in the example, other success measures such as the SDS response delay, the Kappa coefficient of the confusion matrix that summarizes how well the dialogue system achieves the information requirements of the user, or the actual agreement between the intended goal and the achieved one could be used for example. A turn is defined as one system and one user utterance; a dialogue can therefore be thought of as a sequence of turns. The classifiers are trained to predict these metrics, using the checked result as the ground truth. For each dialogue a complete log of the input and output to all components of the SSDS, from user's speech to system's speech (including partial ASR, SLU, beliefs, system actions, etc.) were contained in the data, allowing extraction of acoustic and belief state features for each dialogue turn.

Figure 6:
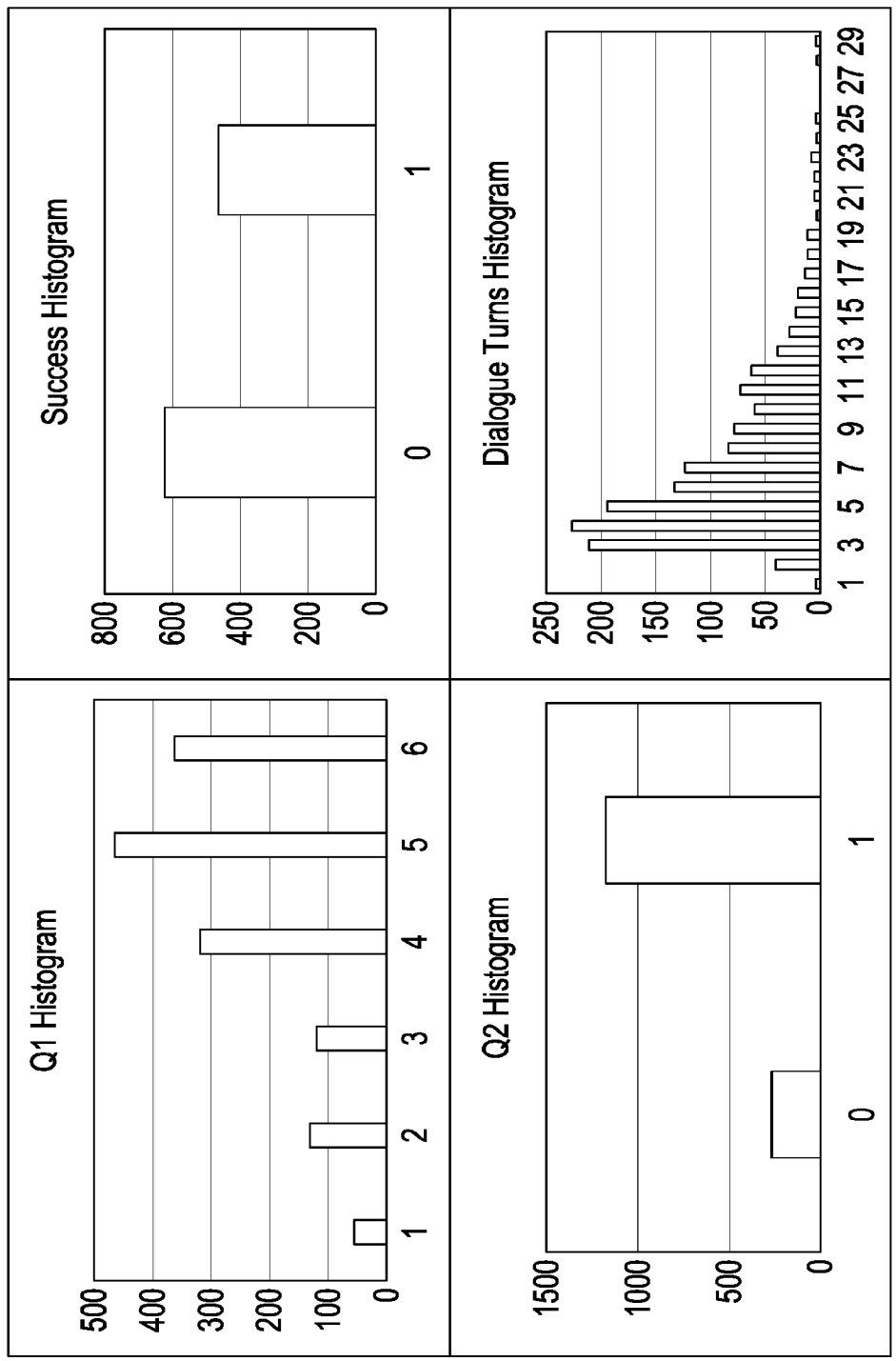
FIG. 6 shows four different success measure value distributions in a dataset used for training the classifier.

FIG. 6 shows the metrics' value distributions in the dataset and includes four histograms showing the value distributions of the metrics of interest.

Below is an example interaction, which is an excerpt of the transcript of an interaction between an AMT worker and an SDS:

System: Hello! I'm here to help you find a suitable laptop. Now please tell me your requirements.
User: I want a laptop for business.
S: What's the price range you have in mind for the laptop? Such as a cheap laptop, an expensive laptop, or a moderately priced laptop?
U: I don't care.
S: Satellite u920t-117 is a very good computer for business computing.
U: Is that in the mid-weight range?
S: The weight of Satellite u920t-117 is 1.52 kilograms.

Q1 (subjective dialogue success) and Q2 (interaction naturalness) are constituents of user satisfaction. Other than these two metrics, the classifiers also predicted the objective dialogue success and the number of dialogue turns.

In this case, users were not asked to provide ratings (i.e. to answer questions Q1 and Q2) after every dialogue turn, but only at the end of each dialogue. Instead of training the classifier using acoustic features inputted for each utterance, the summary statistics of each feature over the course of a dialogue were used. Alternatively, however, users may provide answers at each input utterance. Furthermore, the acoustic features may be input for each utterance, and a success measure generated for each utterance, but the classifier updated only once per dialogue using success measures inputted or determined once per dialogue. For example, the classifier may generate a predicted value for the objective success measure at each turn in the dialogue, but a ground truth value for the objective success measure is only determined at the end of the dialogue, and this is used to adapt the classifier.

In this example, summary statistics for each acoustic and belief state feature were calculated at the end of each dialogue, and these were inputted into the classifier which then generated the success measure. The mean was used for many of the summary statistics in this case, since it is affected by sudden peaks, thus making it informative. The current turn refers to the total turns in the dialogue. The acoustic and belief state features described in Table 1 below were used.

TABLE 1

Example set of acoustic features and belief state features

| Acoustic Features | Belief State Features |
|---|---|
| Mean of RMS | Top user dialogue act |
| Standard deviation of RMS | Entropy of belief state slots |
| Mean of the derivative of RMS | System summary act |
| Mean pitch | Current turn |
| Standard deviation of pitch | |
| Pitch range | |
| Diff. of mean pitch values in consecutive turns | |
| Mean of the derivative of pitch | |

Several classification and regression classifiers were trained to predict the four metrics, including binary SVM (with radial basis function or polynomial kernels), Gaussian Process Regressors (GPR, with squared exponential kernels), and Random Forests (RF).

All experiments were conducted with a 75-25 training-testing protocol, averaged over 10 repetitions. The "Q1" and "Number of Turns" take multiple values, and these were scaled into various scales. For example, the "Number of Turns" was scaled from $\{1, \ldots, 29\}$ to $\{0, \ldots, 2\}$ which can be interpreted as "low", "medium" or "high" number of turns. Also for the "Number of Turns", a binary metric was defined that indicates when the dialogue is shorter than the mean length of successful dialogues:

$$DialogueLength(d) = \begin{cases} 1, & \text{if } NT_d \leq \mu_{NT_{D_s}} \\ 0, & \text{if } NT_d > \mu_{NT_{D_s}} \end{cases}$$

where $NT_d$ is the number of turns of the current dialogue d, where $d \Delta D$, where D is the total set of dialogues used during training, $D_s \subseteq D$ is the set of successful dialogues, and $$\mu_{NT_D} = \frac{1}{|D|} \sum_d^D \{NT_d\}$$

Table 2 shows the accuracy of SVM (with radial basis function or polynomial kernels), Gaussian Process Regressors GPR (with squared exponential kernels), and Random Forests (RF), when using the acoustic features (AF), the belief features (BF) or both sets of features. The accuracy value for each metric is determined by comparing the metric generated by the classifier to the actual metric for an evaluation data set.

TABLE 2

Classification results on the various metrics, when using the summary statistics of the acoustic features (AF), the belief state features (BF) or both acoustic and belief state features (ABF).

| Metric | Alg. | AF | BF | ABF |
|---|---|---|---|---|
| $Q_1$ {0, 1} | SVM | 0.691 | 0.696 | 0.677 |
| $Q_1$ {0, 1} | GPR | 0.746 | 0.697 | 0.746 |
| $Q_1$ {0, 1} | RF | 0.704 | 0.683 | 0.698 |
| $Q_1$ {0-2} | GPR | 0.700 | 0.580 | 0.658 |
| $Q_1$ {0-2} | RF | 0.582 | 0.577 | 0.574 |
| $Q_1$ {0-6} | GPR | 0.334 | 0.295 | 0.333 |
| $Q_1$ {0-6} | RF | 0.400 | 0.296 | 0.373 |
| $Q_2$ | SVM | 0.864 | 0.816 | 0.817 |
| $Q_2$ | GPR | 0.882 | 0.867 | 0.903 |
| $Q_2$ | RF | 0.831 | 0.835 | 0.818 |
| Success | SVM | 0.579 | 0.571 | 0.580 |
| Success | GPR | 0.775 | 0.766 | 0.774 |
| Success | RF | 0.586 | 0.576 | 0.621 |
| DialogueLength | SVM | 0.704 | 0.762 | 0.714 |
| DialogueLength | GPR | 0.951 | 0.795 | 0.671 |
| DialogueLength | RF | 0.880 | 0.837 | 0.926 |
| Turns {0, 1} | SVM | 0.950 | 0.961 | 0.947 |
| Turns {0, 1} | GPR | 0.947 | 0.948 | 0.979 |
| Turns {0, 1} | RF | 0.945 | 0.982 | 0.952 |
| Turns {0-2} | GPR | 0.972 | 0.880 | 0.964 |
| Turns {0-2} | RF | 0.846 | 0.895 | 0.879 |
| Turns {0-3} | GPR | 0.922 | 0.741 | 0.945 |
| Turns {0-3} | RF | 0.792 | 0.845 | 0.837 |
| Turns {0-29} | GPR | 0.716 | 0.193 | 0.389 |
| Turns {0-29} | RF | 0.492 | 0.619 | 0.619 |

Thus Table 2 shows results from classifiers using the summary statistics of the acoustic features extracted from users' utterances and using scaled versions of the metrics of interest as described above. In the same table, the results for the belief state features only and the fusion of acoustic and belief state features are demonstrated.

Although the acoustic features do not have access to the current turn number, they perform well when predicting the DialogueLength metric. ABF also perform well in predicting the number of turns. This could be because AF capture changes in the speakers' signal when the dialogue is longer than usual (e.g. speakers may be getting annoyed or impatient) for example.

The confusion matrix for the DialogueLength metric when AF are used can be seen in Table 3, for the BF can be seen in Table 4, whereas the feature-level fusion results are demonstrated in Table 5 below. Ten individual confusion matrices were produced, however shown are the mean value of the number of instances, followed by the standard deviation in brackets, for each of the individual elements of the confusion matrix, e.g. the mean of the 10 values of the number of dialogues that had a length less than $\mu_{NT_{Ds}}$ and the algorithm predicted thus. In this case, the correctly classified instances when the AF are utilised (Table 3) are more than when the BF are used (Table 4). However, the combination of the two types of features leads to more correctly classified instances, as can be seen in Table 5. The standard deviation is low, especially for the case of the correctly classified instances.

TABLE 3

Confusion matrix for the RF on Dialogue
Length (DL) when using AF features.

| | | Predicted DL | |
|---|---|---|---|
| | | $NT_d \leq \mu_{NTDs}$ | $NT_d > \mu_{NTDs}$ |
| True DL | $NT_d \leq \mu_{NTDs}$ | 199.3 (1.3) | 3.3 (1.2) |
| | $NT_d > \mu_{NTDs}$ | 43.3 (6.3) | 118.1 (6.4) |

TABLE 4

Confusion matrix for the RF on Dialogue
Length (DL) when using BF features.

| | | Predicted DL | |
|---|---|---|---|
| | | $NT_d \leq \mu_{NTDs}$ | $NT_d > \mu_{NTDs}$ |
| True DL | $NT_d \leq \mu_{NTDs}$ | 171.0 (3.7) | 31.5 (3.8) |
| | $NT_d > \mu_{NTDs}$ | 29.3 (4.9) | 132.2 (5.1) |

TABLE 5

Confusion matrix for the RF on Dialogue
Length (DL) when using ABF features.

| | | Predicted DL | |
|---|---|---|---|
| | | $NT_d \leq \mu_{NTDs}$ | $NT_d > \mu_{NTDs}$ |
| True DL | $NT_d \leq \mu_{NTDs}$ | 196.9 (2.5) | 5.7 (2.2) |
| | $NT_d > \mu_{NTDs}$ | 19.0 (4.0) | 142.4 (3.8) |

For the case of subjective success (Q1), SVM was found to have an accuracy of 57.9% and for the understanding statement (Q2) it was 86.4%. The respective accuracies of the RF is 58.6% and 83.1%.

A classifier trained in the manner described above can then be used to train end to end SSDS or specific components of SDS such as dialogue policies. The classifier produces an output measure of success (for example 0 for no success and 1 for success) that can be used in the reward function that is used for training the policy model. Although the following is described for a binary measure, non-binary measures of success can be included in the reward function as well. Where binary measures are used, and the success measure output by the classifier is not a binary measure (e.g. number of dialogue turns), it may be scaled to a binary measure by applying a stored rule (for example, where the number is above some benchmark value the measure=0, where it is below, the measure=1). Where multiple classifiers are used, and multiple success measures are generated, a final success measure value of 1 or 0 may be generated, again by using a set of rules. For example, each success measure may be converted to a binary value of 1 or 0, and then the final success measure value may be 1 if all of the success measure values are 1 and 0 if one or more of the success measure values are 0.

During an initial training stage, as described in relation to FIG. 5 above, a classifier is trained to discriminate, for example, successful from unsuccessful dialogues. During the next stage in training, a dialogue model is trained to output an action in response to an input from a user, where the classifier generates success measures which are used as performance indicators to train the dialogue model. Training the dialogue model can therefore be done without requiring knowledge of the user's goal to be labelled or inputted.

The classifier is domain-independent, so can be easily transferred across domains, i.e. it may be used to train policy models for any domain. Furthermore, a new domain may be introduced without re-training of the classifier.

Furthermore, when only acoustic features are inputted into the classifier, the classifier is not affected by ASR errors, since the classifier does not take input features generated using ASR.

For example, the classifier can be used to train a policy model 18 such as that shown in FIG. 1(a), which is then used during implementation of the SDS to determine output actions. The policy model may be a Gaussian Process SARSA for example. A method of training a policy model in such a manner will be described below. However, it is to be understood that the classifier can also be used to train a dialogue model which replaces the policy model and one or more other components of the SDS shown in FIG. 1(a) in a similar manner. For example, it may be used to train a neural network which takes input speech and outputs actions.

The same acoustic features used to train the classifier (e.g. as described in relation to FIG. 5 above) are then inputted to the already trained classifier during training of the policy model to generate a success measure. The success measure is then used to train the policy model. The classifier may be used only for training the policy model, or may be used during implementation of the policy model as well, as has been described above in relation to FIGS. 2 to 4.

In such a method, the policy model may be trained by repeatedly using the policy model to run through a dialogue with a human or a simulated human. In combination with, or in response to the dialogues with a real or simulated human, the policy is adapted to increase a performance indicator. The performance indicator is generated using the success measure. For example, dialogue policy optimisation may be aimed at estimating the expected long-term reward for a system action being executed at a system state or belief state, such that during implementation of the policy mode, the action with maximum expected reward can be selected at each dialogue turn. The reward values are calculated using the success measure generated using the acoustic features.

Training a policy model in this manner requires some overall measure of dialogue quality. The dialogue quality can be generated from the user's speech signal and used to train the policy model. Acoustic features from the speech signal can be used to predict dialogue success, naturalness, and/or length of the interaction for example, as described above. The way the user talks to the spoken dialogue system can reveal information about his/her internal state. For example, a shouting user may be indicative of a failure during the interaction. That can be used to adapt the dialogue policy. The policy is learned during training and then during implementation the dialogue act is produced based on the trained policy, as shown in FIGS. 2 to 4 for example.

In general, using Reinforcement Learning (RL), the system selects a response that maximises the long-term return of the system. This response may be selected from an abstract action space and then converted to text through language generation. In the general case, a POMDP is defined as a tuple $\{S, A, T, O, \Omega, R, \gamma\}$, where S is the state space, A is the action space, $T:S \times A \to S$ is the transition function, $O:S \times A \to \Omega$ is the observation function, $\Omega$ is a set of observations, $R:S \times A \to \mathbb{R}$ is the reward function, where $\mathbb{R}$ refers to the real numbers and $\gamma \in [0, 1]$ is a discount factor of the expected cumulative rewards $J=E[\Sigma_t \gamma^t R(s_t, a_t)]$, where $E[\ ]$ is the expected value. A policy $\pi: S \to A$ dictates which action to take from each state. An optimal policy $\pi^*$ selects an action that maximises the expected returns of the POMDP, J. Learning in RL comprises finding such optimal policies. Approximation methods, such as use of summary belief states and summary actions can be used. The definition of the reward function dictates the optimality of policies. For example, a reward function for SSDS may be of the form:

$$R(s, a) = \begin{cases} -1, & \text{if } s \notin S^T \\ 20, & \text{if } s \in S^T_{success} \\ 0, & \text{if } s \in S^T_{failure} \end{cases}$$

where $s \in S$, $a \in A$, $S^T \subset S$ is the set of terminal states, $S^T_{success} \subseteq S^T$ the set of successful states, and $S^T_{failure} = S^T/S^T_{success}$ is the set of failure states. A dialogue is considered successful if the retrieved item matched the user's preferences. This is referred to as objective success. $S^T_{success}$, therefore, contains all terminal states for which the dialogue is successful. While this reward function works well in controlled environments, in real-world applications it may not be possible to define $S^T_{success}$ and $S^T_{failure}$ as the true user's goal is unobservable. Moreover, $S^T_{success} \backslash S^T_{failure}$ may not be empty, if the system partially meets the user's goal. The following surrogate methods are therefore used to estimate metrics of dialogue quality instead.

Figure 7:
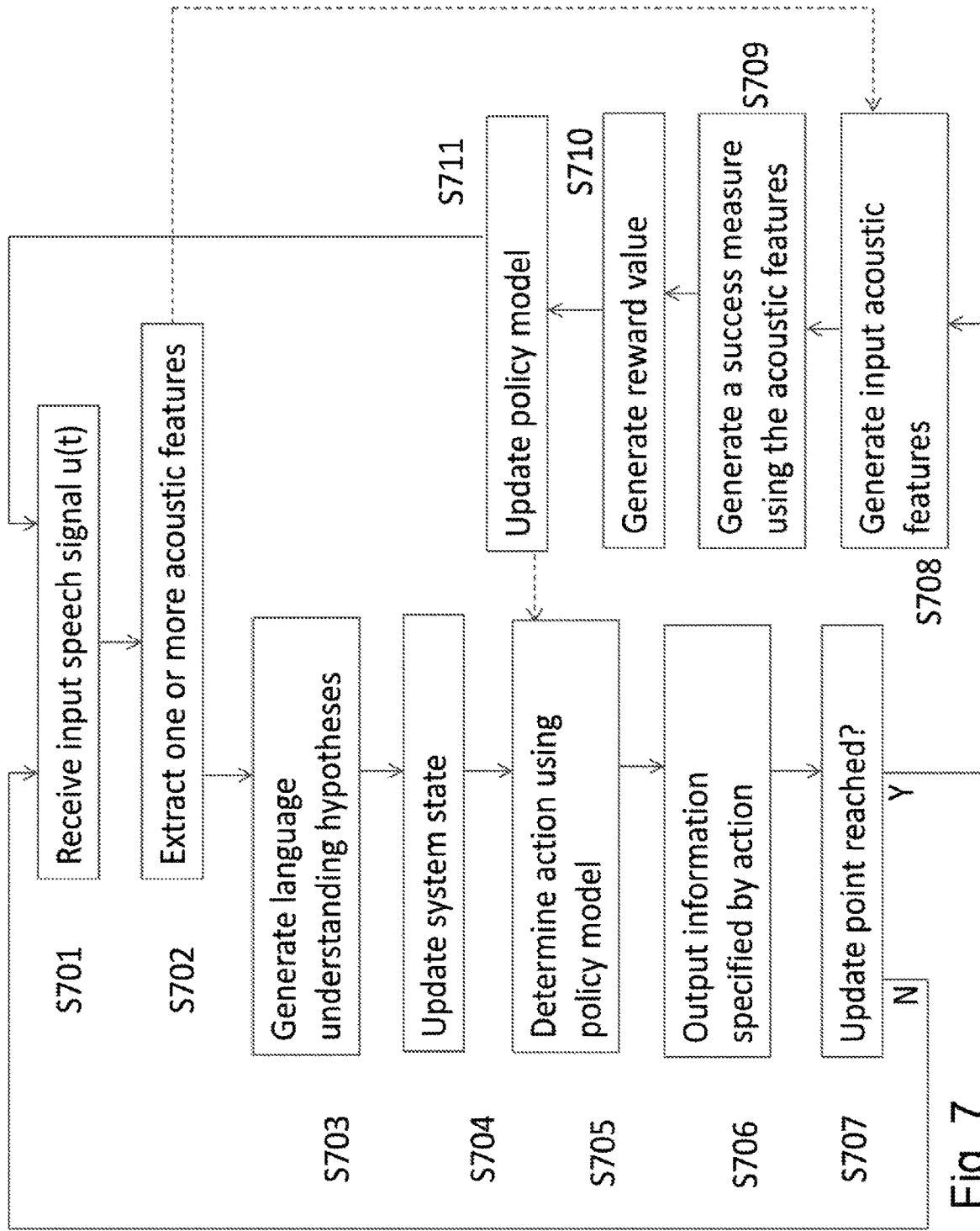
FIG. 7 is a flow chart of an example method of adapting a policy model, in which a success measure generated using the acoustic features is used to update the reward value used to adapt the policy model.

FIG. 7 is a flow chart of an example method of adapting a policy model. The method uses a classifier to generate a success measure, which may be an already trained classifier trained as described in relation to FIG. 5 above.

During training, an n-best list of language understanding hypotheses may be generated from the input speech. These are then used to update the belief state (reflecting an estimate of the user's goals). The n-best list of language understanding hypotheses may be generated using an already trained ASR and natural language processor. The belief state may then be updated by an already trained state tracker model. Alternatively, the ASR, natural language processor and/or system state tracker may be trained together with the policy model.

During training, for each input utterance u(t) received in S701, one or more acoustic features are extracted S702, as described above in relation to S302 for example. The one or more acoustic features comprise acoustic features used for ASR and natural language processing, as well as acoustic features used for generating a success measure.

The n-best list of language understanding hypotheses is generated using ASR and natural language processing in S703, again, as has been described previously. A belief state is then updated in S704. The belief state is input into the policy mode, which then selects the action a in S705. The policy mode stores a quantity Q(s, a), for each state s and action a. For an input state s (e.g. input belief state B) the policy selects the action a with the highest Q value for that state. Information specified by the selected action is then outputted to the user in S706.

S707 comprises a step of determining whether an update point has been reached. The update point may be the end of a dialogue for example. If not, the next input utterance in the dialogue is received and the above steps are repeated.

Once the update point is reached, input acoustic features are then generated. For example, where the update point is the end of the dialogue, one or more of: mean, median, minimum and maximum value, standard deviation, skewness and kurtosis of the acoustic feature values extracted for each utterance in the dialogue are generated. For example, for each utterance in the dialogue, a value corresponding to each of a plurality of frequency bands may be extracted in S702. The mean of the values for each band may then be generated in S708. Alternatively, the features for all of the utterances may be concatenated.

A feature vector comprising these acoustic features is then inputted into the trained classifier, which outputs a success measure in S709 in the same manner as has been described previously. Further features may be included in the feature vector, for example belief features may be included. The same acoustic features used to train the classifier (e.g. as described in relation to FIG. 5 above) are inputted to the already trained classifier in S709 to generate a success measure.

Although the features are described as being generated from acoustic features extracted from every utterance in the dialogue, alternatively, and as has been described above, only one or more of the utterances in the dialogue may be used, e.g. the first, middle or last M utterances, where M is an integer greater than or equal to 1 and less than or equal to N. The summary or concatenated features from these utterances are generated in S708 at the end of the dialogue and inputted into the classifier.

A reward value is then calculated using the success measure in S710. The reward value is calculated from a reward function. The reward function includes the success measure as an input. An example of the reward function may be:

$$R = \{Y \times (\text{success measure})\} - N$$

where N is the total number of dialogue turns (i.e. the number of dialogue turns that actually occurred, not that predicted by a classifier) and the success measure is output from the classifier in S709 or is determined using the output from the classifier in S709. Y is a pre-defined factor which may be equal to 20 for example. J is the expected value of accumulated rewards as defined by the function R, over time. R defines the immediate reward while J estimates the reward from that point on.

The output of the classifier in S709 may be converted to a binary value before being input into the reward function. For example, the number of dialogue turns may be converted into a binary value of 1 or 0 as has been described above. The measure of dialogue naturalness (which is "yes" or "no") may be converted to a binary value (1=yes and 0=no).

Where multiple classifiers output multiple success measures in S709, a final success measure value of 1 or 0 may be generated using a set of rules. For example, each success measure may be converted to a binary value of 1 or 0, as has been described above, and then the final success measure value may be 1 if all of the success measure values are 1 and 0 if one or more of the success measure values are 0.

In S711, the policy parameters are updated using the reward value and an update rule. This may be done using a Q-learning based technique for example. For those dialogue turns for which no prediction is available a constant reward value may be used (for example 0 or −1). For the others, the value given by the R function is used. For example, where the update point is the end of each dialogue, the R value generated by the R function is used at the end of each dialogue, for the other dialogue turns a reward value of 0 is used.

The next input utterance is then received, for example, where the update point is the end of the dialogue, the first input utterance for the next dialogue is then received, and the updated policy model used to select output actions. This is repeated, running through many dialogues, and the policy model updated after each dialogue to estimate the expected long-term reward Q(s,a) for a system action a being executed at a state s (where the state s may be a belief state B), such that during implementation of the policy model, the action with maximum expected reward can be selected at each dialogue turn.

In this example, the reward value is assigned at the end of each dialogue, and the policy parameters are updated once for each dialogue. Alternatively however, a success measure value may be generated for each utterance, from the acoustic features extracted for that utterance. In this case, a reward value is assigned each utterance using a reward function, which is a function of the success measure generated for each utterance, and the policy parameters are updated each utterance, for example using an update rule based on a Q-learning technique.

The acoustic features are taken as input to C(i), i=i . . . M classifiers and then used to determine a reward value based on the classifiers' output.

In the above described methods of training the policy model, a contribution to the reward value estimation is made by automatically evaluating the user's feedback, as a function of the user's voice.

The policy takes as input the belief state and produces as output the dialogue act. During training, the policy is updated to maximise the reward function. That is the system is optimised to maximise rewards over the dialogue. The rewards are calculated using a success measure generated from the acoustic features. In the above method, the success measure is generated by inputting the acoustic features into a classifier. This success measure is then inputted into the reward function and used to update the policy model.

Additionally, in order to update the reward value, the set of acoustic features {P U K} can be used per se. For example, one or more of the extracted acoustic features can be converted to a binary or discrete measure and included in the reward function.

In this case, the reward value may be calculated from the function below for example:

$$R=\{Y\times(\text{success measure})\}-N-(\text{acoustic feature measure})$$

or $$R=\{Y\times(\text{success measure})\}-N-\{i^*(\text{acoustic\_feature\_measure})\}+\{p^*Q1\}+\{s^*Q2\}$$

where (acoustic feature measure) may be determined from one or more of the acoustic features. For example, (acoustic feature measure) may be equal to 0 if the mean RMS is greater than a threshold value and equal to 1 if the mean RMS is less than a threshold value. i, p and s are weights. Y may be 20 for example.

In the method described in relation to FIG. 7, acoustic features are extracted, and used to adapt the policy model. In other words, the acoustic features are used to generate a measure of success, which is then used to update the policy parameters. The method can be used to train a policy model for an SDS. Once trained, the policy model can be stored and used. During use, the policy parameters are no longer updated, and acoustic features need no longer be used to generate a reward value. Acoustic features may still be used to generate a success measure for some other purpose however, as has been described previously in relation to FIGS. 2 to 4.

Figure 8:
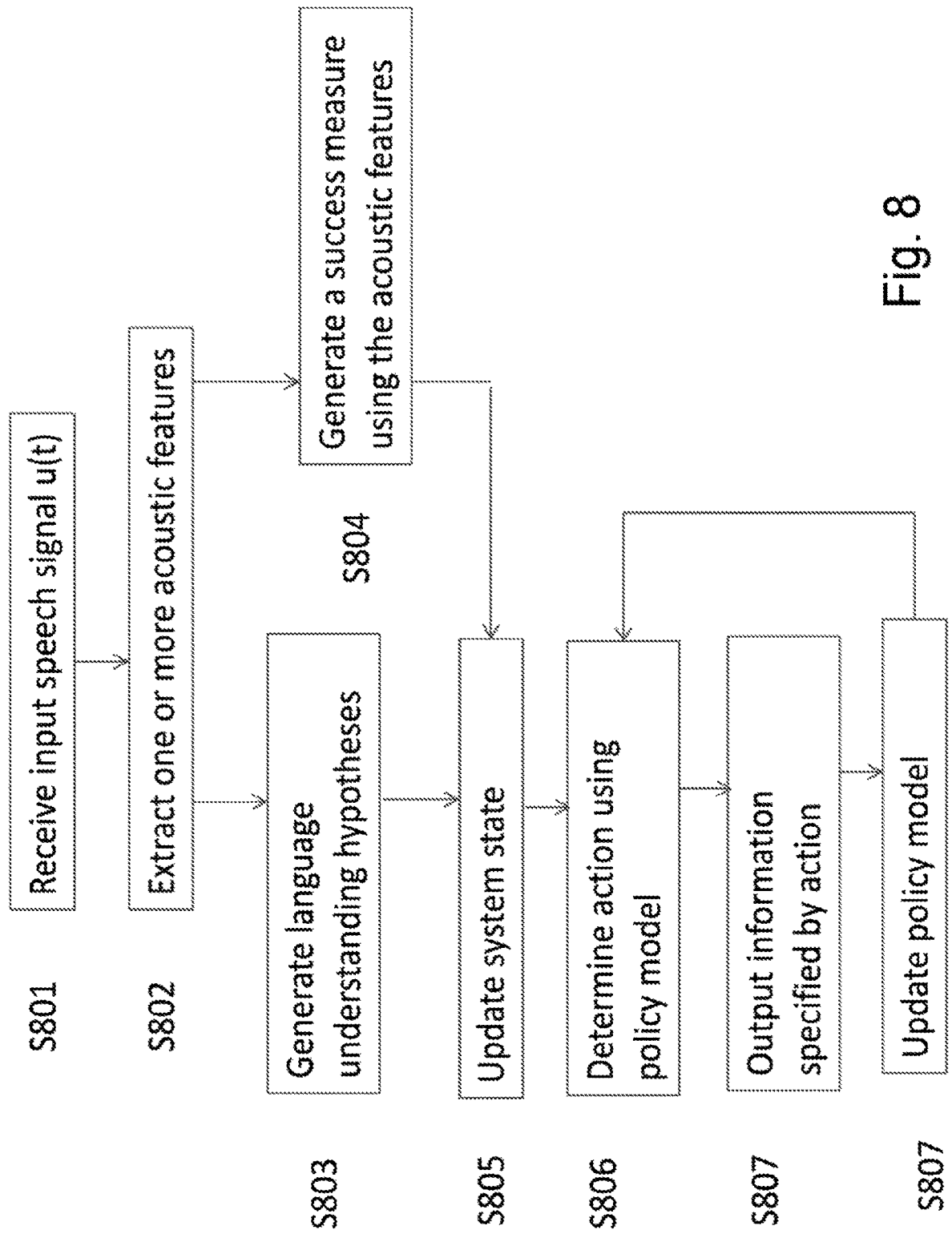
FIG. 8 is a flow chart of an example method of adapting a policy model, in which a success measure generated using the acoustic features is used as part of the system state.

FIG. 8 shows an alternative method of training a policy model, in which the success measure and/or the acoustic features are used as input to the system state, in a similar manner as described in relation to FIG. 3 above for example.

In order to implement a SDS such as that described in relation to FIGS. 3 and 4, the policy model must be trained with the success measure and/or acoustic features included in the system state which is inputted into the policy model. Such a method of training is described below.

The policy model is trained by repeatedly using the policy model to run through a dialogue with a human or a simulated human. In combination with, or in response to the dialogues with a real or simulated human, the policy is adapted to increase a performance indicator. For example, dialogue policy optimisation may be aimed at estimating the expected long-term reward for a system action being executed at a system state or belief state, such that during implementation of the policy mode, the action with maximum expected reward can be selected at each dialogue turn. Training a policy model in this manner requires some overall measure of dialogue quality, which may be inputted by the user at the end of each dialogue or after each utterance for example. The policy model may alternatively be trained using a stored corpus of data in which a measure of dialogue quality is included, for example as in the Amazon Mechanical Turk (AMT) data set.

S801 to S807 are performed in the same manner as S301 to S307 described above. The same acoustic features used to train the classifier (e.g. as described in relation to FIG. 5 above) are inputted to the already trained classifier in S804 to generate a success measure. The success measure is then included in the system state, which is inputted into the policy model. The same classifier is also used during implementation of the policy model as well, as described in relation to FIG. 3 above.

Belief state features may also be inputted to the classifier in S304, as described in relation to FIG. 4 above. The acoustic features may be included directly in the belief state instead of or as well as the success measure, as has been described above in relation to the implementation stage.

The same features used to train the classifier are used to generate the success measure to include in the system state during training of the policy model and during implementation of the SDS. Similarly, the same features are included in the system state during training of the policy model and implementation of the SDS.

The policy parameters are updated, either at the end of each dialogue or after each utterance, based on some input measure of quality. A Q-learning based update rule may be used for example. This measure of quality may be inputted directly by the user for example.

Alternatively, reward values used to update the policy model may be calculated using the acoustic features to generate a success measure, as has been described above in relation to FIG. 7.

Figure 9:
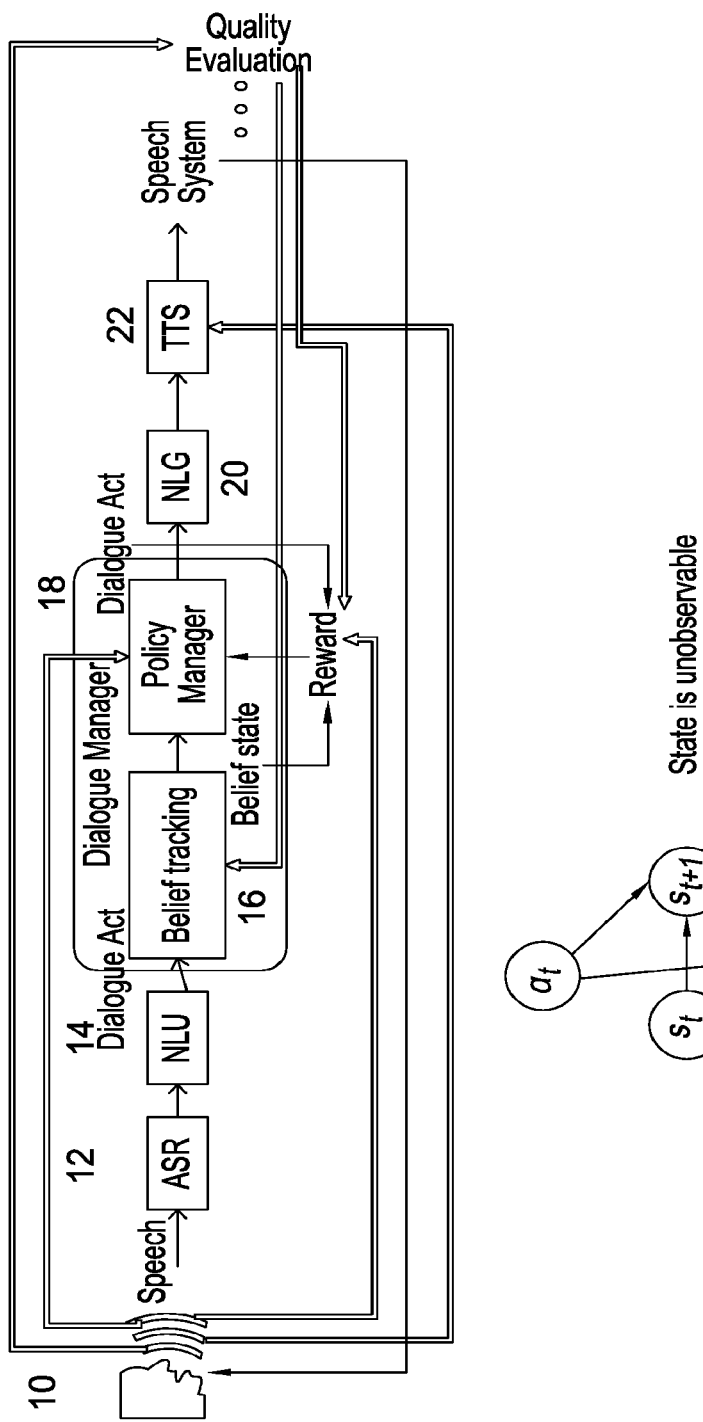
FIG. 9 is a schematic illustration of an end-to-end SDS training architecture in which the acoustic features are used as input to the reward function and to the belief state.

FIG. 9 is a schematic illustration of an end-to-end training architecture in which the acoustic features are used as input to the reward function and to the belief state.

An ASR 12 step converts speech from a human user 10 into text, a natural language processor 14 identifies and collates semantic information, a system state tracker 16 updates a system state, a policy model 18 generates an output action, a natural language generator 20 generates the necessary text specified by the action and a text to speech synthesizer 22 synthesizes speech.

The acoustic features are used in a "quality evaluation" step, in which a measure of success is generated. The output of this step, i.e. the success measure is inputted into the policy model together with the belief state. The success measure can be considered to be part of the belief state. The policy model is trained to map the acoustic features and belief state features to output actions.

The policy model is trained by estimating the expected long-term reward for a system action being executed at a system state or belief state. In this case, the acoustic features are used to generate an input into the reward calculation. The input to the reward function may comprise a success measure and may also comprise one or more acoustic features, as shown. The arrows from "belief state" and "dialogue act" to "reward" demonstrate the way that a POMDP system works, as shown in further detail in the lower figure. The reward depends on the state and the action to be made.

In this training method, the user's voice is exploited to a) predict the quality of the interaction and b) to infer the reward function. In both cases then the policy and TTS can be optimized. The acoustic features may also be used to train the text to speech system alongside the policy model, as shown.

Figure 10:
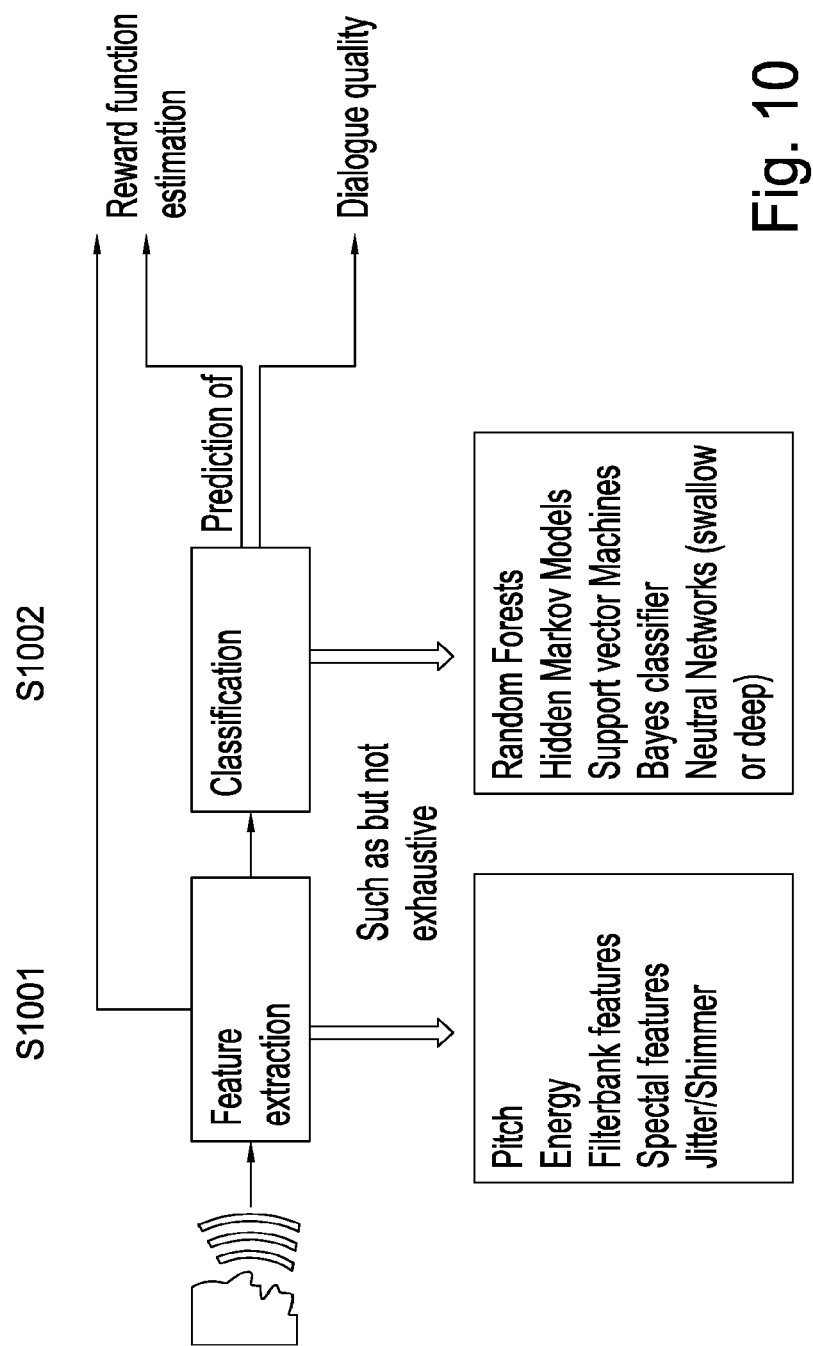
FIG. 10 is a schematic illustration showing uses for the acoustic features for predicting the quality of the dialogue and/or for estimating the reward function.

FIG. 10 is a schematic illustration showing the two uses for the acoustic features: for predicting the quality of the dialogue and/or for estimating the reward function.

In S1001, acoustic features are extracted from the speech signal, and may include but are not limited to pitch, energy, filterbank features, other spectral features and jitter/shimmer.

These features can be inputted into a classifier, which outputs a success measure. This success measure can be used in the reward function, or can be used to supplement the belief state during training and implementation of the SDS. The acoustic features themselves may also be included in the belief state and/or in the calculation of the reward.

The proposed acoustic features can be included in the dialogue state and policy learning (whether RL or DNN) used to solve the credit assignment problem while optimising for dialogue success. This richer dialogue state may be used to guide not only the system's output at system act level, but provide information to Text To Speech and Language Generation as well. In other words, the acoustic features used to generate the success measure may also be used for text to speech and language generation.

The SDSs described may be user-centred spoken dialogue systems exploiting the user's voice. The dialogue system may estimate the dialogue process and can adapt to it, based on the user's voice. The system may take as input audio, analyse it, and then use the results to enrich the interaction. The interaction can be enriched either to a) predict the quality of the dialogue or b) contribute to the calculation of the reward function. In both cases the dialogue system is adapted to take the user's utterance into account. Input user audio is used to extract audio features that are then given as input to classifiers or exploited per se. Thus the speech can be used either to facilitate estimation of the case of the reward function value or to enrich the belief state for the case of quality evaluation. The classifier may be adapted to a specific user, i.e. it may be subject dependent. For example, the classifier may be trained with a particular user, and then implemented in a SDS intended for use with the same user. It may be trained with two or more users, and may identify a particular user and be adapted differently for each user.

Acoustic features are rich in information that is useful for predicting constituents of user satisfaction. The above described methods therefore use acoustic features to predict metrics of dialogue quality.

Estimation of metrics related to user satisfaction and dialogue quality when interacting with SSDS, using simple acoustic features, are described. Such metrics are predicted by exploiting audio features. The methods combine signal processing for feature extraction (for example RMS and pitch related features) with supervised classification (for example SVMs, GPRs and RFs). Audio features enhance the classifiers' performance either when used alone or in conjunction with belief state features.

The audio signal is a rich source of information, revealing paralinguistic information. That information can be used to a) predict the quality of the dialogue and/or b) contribute to the calculation of the reward function. With respect to the quality of the dialogue, this may reduce mismatch between objective and subjective dialogue task achievement. Furthermore, the measure is domain independent, and does not require access to the users' goal, which is hidden and may change over time. For the case of reward function estimation, it may avoid a need to arbitrarily define a success measure in advance within the reinforcement learning framework.

Further embodiments are set out in the following clauses:
1. A spoken dialogue method comprising:
    extracting one or more acoustic features from an input speech signal originating from a user, where the speech signals form part of a dialogue;
    determining an action using a dialogue model, wherein the input to the dialogue model is generated using the input speech signal;
    outputting information specified by the action at the output;
    generating a success measure using the acoustic features.
2. A spoken dialogue method comprising:
    extracting one or more acoustic features from the input speech signal originating from a user, where the speech signals form part of a dialogue;
    updating a system state based on the input speech signal using a state tracker model, wherein the updated system state comprises the one or more acoustic features;
    determining an action using a policy model, wherein the input to the policy model is the updated system state;
    outputting information specified by the action at the output.
3. A method of adapting a classifier model to generate a success measure from data comprising spoken dialogues between a human or a simulated human user and a spoken dialogue system, the data comprising success measures, the method comprising:
    extracting one or more acoustic features from the input speech signal;
    generating a success measure using the acoustic features as input to the classifier;
    adapting the classifier using the success measures in the data.
4. A method of adapting a spoken dialogue system, the method comprising:
    extracting one or more acoustic features from the input speech signal;
    updating a system state based on the input speech signal using a state tracker model, wherein the updated system state comprises the one or more acoustic features;
    determining an action using a policy model, wherein the input to the policy model is the updated system state;
    output information relating to the action at the output;
    adapting the policy model to increase the performance indicator.
5. A carrier medium comprising computer readable code configured to cause a computer to perform the method of any of clauses 1 to 4.

6. A spoken dialogue system comprising:
an input for receiving data relating to speech signals originating from a user, where the speech signals form part of a dialogue;
an output for outputting information specified by an action; and
a processor configured to:
extract one or more acoustic features from the input speech signal;
determine an action using a dialogue model, wherein the input to the dialogue model is generated using the input speech signal;
output information specified by the action at the output;
generate a success measure using the acoustic features.

7. The spoken dialogue system according to clause 6, wherein the dialogue model comprises a policy model and a state tracker model and wherein the processor is further configured to:
update a system state based on the input speech signal using the state tracker model;
update the system state to include a success measure;
wherein the updated system state is the input to the policy model.

While certain arrangements have been described, these arrangements have been presented by way of example only, and are not intended to limit the scope of the inventions. Indeed the methods and systems described herein may be embodied in a variety of other forms; furthermore, various omissions, substitutions and changes in the form of methods and apparatus described herein may be made.

The invention claimed is:

1. A spoken dialogue system comprising:
an input configured to receive data relating to a speech signal originating from a user, where the speech signal forms a part of a dialogue;
a processor configured to:
extract one or more acoustic features from the input speech signal;
update a system state based on the input speech signal using a state tracker model;
determine a system action using a policy model, wherein the updated system state is the input to the policy model, and a reward function depends on the system action and the system state;
generate a success measure using one or more classifiers inputting feature vectors including the acoustic features, wherein the success measure as an input is included in the reward function;
calculate a reward value R of the reward function using the success measure, the reward function being calculated by formula:

$$R=\{Y\times(\text{success measure})\}-N,$$

wherein N is a total number of dialog turns that have actually occurred and Y is a pre-determined factor; and
update the policy model using the reward value; and
an output configured to output information specified by the system action;
wherein a feature vector is generated using the acoustic features, and inputted into one or more classifiers, and the one or more classifiers are configured to output the success measure.

2. The spoken dialogue system according to claim 1, wherein a plurality of different success measures are generated.

3. The spoken dialogue system according to claim 1, wherein the feature vector further comprises features extracted from the system state updated based on the speech signal.

4. The spoken dialogue system according to claim 1, wherein the output is an output configured to output a speech signal and wherein the information relating to the system action comprises:
generating text specified by the system action;
converting the text to speech and outputting the speech signal at the output.

5. The spoken dialogue system according to claim 1, wherein the acoustic features are one or more of an indication of energy of the speech signal, an indication of the pitch of the speech signal and spectral information for the speech signal.

6. The spoken dialogue system according to claim 5, wherein the spectral information comprises Mel-frequency cepstral coefficient values.

7. A method of adapting a spoken dialogue system, the method comprising:
extracting one or more acoustic features from an input speech signal;
updating a system state based on the input speech signal using a state tracker model;
determining a system action using a dialogue model, wherein the input to the dialogue model is generated using the input speech signal, and a reward function depends on the system action and the system state;
outputting information relating to the action at the output;
generating a success measure using one or more classifiers inputting feature vectors including the acoustic features, wherein the success measure as an input is included in the reward function;
calculating a reward value R of the reward function using the success measure, the reward function being calculated by formula:

$$R=\{Y\times(\text{success measure})\}-N,$$

wherein N is a total number of dialog turns that have actually occurred and Y is a pre-determined factor; and
adapting the dialogue model to increase a performance indicator.

8. The method according to claim 7, wherein the performance indicator is generated using the success measure.

9. The method according to claim 8, wherein the performance indicator is the reward value generated using the reward function, wherein the reward function is a function of the success measure.

10. The method according to claim 9, wherein the reward function is also a function of one or more of the acoustic features.

11. The method of claim 7, wherein a feature vector is generated using the acoustic features extracted from the speech signal, and inputted into a classifier, wherein the classifier is configured to output a success measure.

12. The method of claim 11, wherein there is a plurality of classifiers, each generating a different success measure which are combined to form a single success measure which is included in the reward function.

13. The method according to claim 11, wherein the dialogue model comprises a policy model and a state tracker model, wherein the processor is further configured to:
update the system state based on the input speech signal using the state tracker model, wherein the updated system state is the input to the policy model, wherein the updated system state comprises the success measure.

14. A non-transitory carrier medium comprising computer readable code configured to cause a computer to perform the method of claim 7.

\* \* \* \* \*